(12) United States Patent
Gu et al.

(10) Patent No.: US 10,409,966 B2
(45) Date of Patent: Sep. 10, 2019

(54) OPTIMIZING AND PROTECTING SOFTWARE

(71) Applicant: IRDETO B.V., Hoofddorp (NL)

(72) Inventors: Yuan Gu, Hoofddorp (NL); Harold Johnson, Hoofddorp (NL); Yaser Eftekhari, Hoofddorp (NL); Bahman Sistany, Hoofddorp (NL); Robert Durand, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 270 days.

(21) Appl. No.: 15/300,538

(22) PCT Filed: Mar. 31, 2015

(86) PCT No.: PCT/EP2015/057009
§ 371 (c)(1),
(2) Date: Apr. 17, 2017

(87) PCT Pub. No.: WO2015/150376
PCT Pub. Date: Oct. 8, 2015

(65) Prior Publication Data
US 2017/0116396 A1 Apr. 27, 2017

(30) Foreign Application Priority Data
Mar. 31, 2014 (GB) .................. 1405755.8

(51) Int. Cl.
*G06F 21/00* (2013.01)
*G06F 21/12* (2013.01)
(Continued)

(52) U.S. Cl.
CPC ............. *G06F 21/125* (2013.01); *G06F 8/41* (2013.01); *G06F 21/14* (2013.01); *G06F 2221/0737* (2013.01)

(58) Field of Classification Search
CPC combination set(s) only.
See application file for complete search history.

(56) References Cited

U.S. PATENT DOCUMENTS 6,594,761 B1 7/2003 Chow et al.
6,609,248 B1 * 8/2003 Srivastava ............ G06F 8/447
717/141
(Continued)

FOREIGN PATENT DOCUMENTS

CN 1592875 A 3/2005
CN 102947835 A 2/2013
(Continued)

OTHER PUBLICATIONS

Chinese First Office Action for Chinese Application Serial No. 201580028800.7 dated Oct. 29, 2018, 30 pages. (Including English Translation).
(Continued)

*Primary Examiner* — Brandon S Hoffman
*Assistant Examiner* — William A Corum, Jr.
(74) *Attorney, Agent, or Firm* — Rimon PC

(57) ABSTRACT

A method comprising: carrying out optimization of an item of software in a first intermediate representation; carrying out protection of the item of software in a second intermediate representation different to the first intermediate representation.

34 Claims, 13 Drawing Sheets

(51) Int. Cl.
*G06F 21/14* (2013.01)
*G06F 8/41* (2018.01)

(56) References Cited

U.S. PATENT DOCUMENTS

| | | | |
|---|---|---|---|
| 6,779,114 B1 | 8/2004 | Chow et al. | |
| 6,842,862 B2 | 1/2005 | Chow et al. | |
| 7,350,085 B2 | 3/2008 | Johnson et al. | |
| 7,395,433 B2 | 7/2008 | Chow et al. | |
| 7,397,916 B2 | 7/2008 | Johnson et al. | |
| 9,336,370 B2 * | 5/2016 | Chevallier-Mames | G06F 21/14 |
| 2003/0163718 A1 | 8/2003 | Johnson et al. | |
| 2003/0221121 A1 | 11/2003 | Chow et al. | |
| 2004/0139340 A1 | 7/2004 | Johnson et al. | |
| 2007/0169039 A1 * | 7/2007 | Lin | G06F 8/34 717/146 |
| 2008/0115119 A1 * | 5/2008 | Lagergren | G06F 8/443 717/148 |
| 2008/0134158 A1 * | 6/2008 | Salz | G06F 8/34 717/148 |
| 2008/0178149 A1 * | 7/2008 | Peterson | G06F 8/437 717/110 |
| 2008/0271001 A1 | 10/2008 | Nonomura et al. | |
| 2008/0288921 A1 | 11/2008 | Jacob et al. | |
| 2010/0153936 A1 * | 6/2010 | Porras | G06F 8/315 717/146 |
| 2010/0306746 A1 * | 12/2010 | Barua | G06F 8/52 717/136 |
| 2011/0167407 A1 * | 7/2011 | Betouin | G06F 21/14 717/120 |
| 2013/0014274 A1 * | 1/2013 | Goodes | G06F 21/6209 726/26 |
| 2013/0139137 A1 * | 5/2013 | Zhao | G06F 8/443 717/158 |
| 2013/0212365 A1 * | 8/2013 | Chen | G06F 17/5054 713/1 |
| 2013/0311993 A1 * | 11/2013 | Benedetti | G06F 8/37 718/1 |
| 2014/0258996 A1 * | 9/2014 | Brackman | G06F 8/41 717/151 |
| 2016/0274879 A1 * | 9/2016 | Rioux | G06F 8/427 |
| 2016/0357530 A1 * | 12/2016 | Cheng | G06F 8/47 |
| 2017/0091467 A1 * | 3/2017 | Pogorelik | G06F 17/24 |
| 2017/0147299 A1 * | 5/2017 | Lai | G06F 8/41 |
| 2017/0177314 A1 * | 6/2017 | Powers | G06F 8/52 |

FOREIGN PATENT DOCUMENTS

| | | |
|---|---|---|
| WO | 02/37245 A2 | 5/2002 |
| WO | 2009140774 A1 | 11/2009 |
| WO | 2011120123 A1 | 10/2011 |
| WO | 2012126077 A1 | 9/2012 |
| WO | 2015/150376 A1 | 10/2015 |

OTHER PUBLICATIONS

European Office action for European Application Serial No. 15714787.7, dated Feb. 8, 2019, 5 Pages.
International Preliminary Report on Patentability issued in PCT Application No. PCT/EP2015/057009, dated Oct. 13, 2016, 9 pages.
International Search Report and Written Opinion cited in corresponding International Application No. PCT/EP2015/057009 dated Aug. 10, 2015.
Giovanni Agosta et al: 11 Compiler-based side channel vulnerability analysis and optimized countermeasures application May 29, 2013; May 29, 2013-Jun. 7, 2013. May 29, 2013 (May 29, 2013). pp. 1-6.
Bin Zeng Department of Computer Science and Engineering Lehigh University: "Strato: A Retargetable Framework for Low-Level Inclined-Reference Monitors", USENIX, Aug. 14, 2013 (Aug. 14, 2013), pp. 1-14.
Asm.js—frequently asked questions, http://asmjs.org/faq.html accessed on Mar. 30, 2015.
Github—Emscripten: An LLVM-to-JavaScript Compiler, https://github.com/kripken/emscripten accessed on Mar. 30, 2015.
S. Chow et al., "A White-Box DES Implementation for DRM Applications", Cloakware Corp.
Asm.js—Working Draft (Aug. 18, 2014), http://asmjs.org/spec/latest/ accessed on Mar. 30, 2015.
Clan: A C Language Family Frontend for LLVM, http://clang.llvm.org/ accessed on Mar. 30, 2015.
The LLVM Compiler Infrastructure, http://llvm.org/ accessed on Mar. 30, 2015.
Hardware description language, Wikipedia, https://en.wikipedia.org/w/index.php?title=Hardware_description_language&oldid=6 accessed on Sep. 26, 2016.
Trie: Difference between revisions, Wikipedia, https://en.wikipedia.org/w/index.php?title=Trie&diff=600464748&oldid=600130937 accessed on Sep. 26, 2016.
S. Chow et al., "White-Box Cryptography and an AES Implementation", Cloakware Corporation.

* cited by examiner

OPTIMIZING AND PROTECTING SOFTWARE

The present application is the United States national stage of International Application No. PCT/EP2015/057009, filed Mar. 31, 2015 and claims priority to Great Britain Application No. 1405755.8, filed Mar. 31, 2014, the entire contents of which are incorporated herein by reference.

FIELD OF THE INVENTION

The invention relates to methods and apparatus for providing security protection and performance optimization of software.

BACKGROUND OF THE INVENTION

Over recent years there has been a large increase in the number of end user computer devices for which programmers provide software, much of this increase being in the realm of devices for mobile telephony and mobile computing, including smart phones, tablet computers and the like, but also in the realm of more traditional style desktop computers as well as computers embedded in other manufactured goods such as cars, televisions and so forth. A large part of the software provided to such devices is in the form of applications commonly referred to as "apps", and this software may typically be provided in the form of native code, scripting languages such as JavaScript, and other languages such as Java.

Often, such software, and data or content which the software is used to mediate to a user, is at risk of compromise if the software is not suitably protected using various software protection techniques. For example, such techniques may be used to make it very difficult for an attacker to extract an encryption key which could be used to gain unauthorised access to content such as video, audio or other data types, and may be used to make it very difficult for an attacker to replicate software for unauthorised use on other devices.

However, the use of such software protection techniques can lead to a reduction in the performance of the software, for example decreasing execution speed, increasing the amount of memory needed to store the software on a user device, or increasing the memory required for execution. Such software protection techniques may also be difficult to apply across a wide range of different software types, for example pre-existing software written in different source code languages or existing in particular native code formats.

It would be desirable to be able to provide protection against attacks for items of software, and to provide such protection across a range of software representations such as different source code languages and native code types, while also maintaining good levels of performance of the software on end user devices. It would also be desirable to deliver software suitably protected in this way for use on multiple different platform types.

SUMMARY OF THE INVENTION

The invention provides a unified security framework in which the advantages of software tools in a first collection which are used for translation between representations, for optimization, compilation and so forth, are combined with the advantages of software tools in a second collection which are used for protection of software. In one example, the software tools in the first collection may be tools of the LLVM project, which generally operate using the LLVM intermediate representation. However, tools from other collections which operate using other intermediate representations may be used, for example tools from the Microsoft common language infrastructure, which typically use the common intermediate language CIL. Below, the intermediate representation used by the software tools in the first collection will be denoted as a first intermediate representation. Note that software tools in the first collection may also include tools for protection of software, such as binary rewriting protection tools.

An intermediate representation is a software representation which is neither originally intended for execution on an end user device, nor originally intended for use by a software engineer in constructing original source code, although either such activity is of course possible in principle. In the examples of the invention described below, neither the original software input to the unified security framework, nor the transformed software output for use on end user devices is cast in an intermediate representation.

The software tools in the second tool collection use a different intermediate representation, which is typically better suited, or originally intended for use by software tools which apply security protection transformations to items of software processed by the unified security framework. This intermediate representation is generally denoted below as the second intermediate representation, and is different to the first intermediate representation. The second intermediate representation may be designed in such a manner such that source code in languages such as C and C++ can be readily translated into the second intermediate representation, and from which source code in the same or similar languages can be readily reconstructed, by suitable conversion tools.

More generally, the invention provides a unified security framework in which software tools for applying security transformations to items of software are provided such that multiple security transformation steps may be carried out, for example successively on an item of software, in multiple different intermediate representations. The unified security framework may also provide software tools for applying optimization transformations to items of software such that multiple optimization transformation steps may be carried out, for example successively on an item of software, in multiple different intermediate representations.

The invention may be used to accept an input item of software in any input language or native code/binary representation for optimization and protection, and to output the protected and optimized item of software in various forms including any desired native code/binary representation, JavaScript or a subset of JavaScript, etc. In some embodiments the input representation, for example a particular binary code, may be the same as the output representation, thereby carrying out optimization and protection on an existing binary code item of software.

To this end, the invention provides a method comprising carrying out optimization of an item of software in a first intermediate representation, and carrying out protection of the item of software in a second intermediate representation which is different to the first intermediate representation.

The optimization in the first intermediate representation may be carried out both before and after carrying out protection in the second intermediate representation, and the method may therefore comprise converting the item of software from the first intermediate representation to the second intermediate representation after carrying out optimization a first time and before subsequently carrying out protection, and converting from the second intermediate representation to the first intermediate representation after carrying out protection and before subsequently carrying out optimization a second time.

Similarly, the protection in the second intermediate representation may be carried out both before and after carrying out optimization in the first intermediate representation, and the method may therefore comprise converting the item of software from the second intermediate representation to the first intermediate representation after carrying out protection a first time and before subsequently carrying out optimization, and converting from the first intermediate representation to the second intermediate representation after carrying out optimization and before subsequently carrying out protection a second time.

Steps of protection and optimization in the relevant intermediate representations can be carried out alternately any number of times, starting with either protection or optimization, and proceeding with one or more further steps in an alternating fashion.

As mentioned above, the first intermediate representation may be LLVM intermediate representation, LLVM IR, although other intermediate representations could be used such as Microsoft CIL.

More generally, the invention may provide carrying out optimization of an item of software using optimization steps carried out in one or more intermediate representations, and carrying out protection of the item of software using protection steps in one or more intermediate representations some or all of which may be the same as or different to the intermediate representations used for carrying out the optimization.

Optimization of the item of software may comprise various types of optimization, for example for one or more of size, runtime speed and runtime memory requirement of the item of software. Techniques to achieve such optimizations may include vectorization, idle time, constant propagation, dead assignment elimination, inline expansion, reachability analysis, protection break normal and other optimizations.

Protection of the item of software in the second intermediate representation comprises applying one or more protection techniques to the item of software, in particular security protection techniques which protect program and/or data aspects of the software from attack. Such techniques may include, for example, white box protection techniques, node locking techniques, data flow obfuscation, control flow obfuscation and transformation, homomorphic data transformation, key hiding, program interlocking, boundary blending and others. The techniques used may be combined together in various ways to form one or more tools, for example as a cloaking engine implemented as part of an optimization and protection toolset.

The item of software is provided in an input representation which is typically different to both of the first and second intermediate representations. The method therefore may involve converting the item of software from the input representation to the first intermediate representation before carrying out the optimization, and typically also before carrying out the protection mentioned above. In some embodiments, the item of software in the input representation is converted to the second intermediate representation and then converted from the second intermediate representation before the first optimisation, and optionally also before the protection is carried out.

The input representation may be a source code representation such as C, C++, Objective-C, Java, JavaScript, C#, Ada, Fortran, ActionScript, GLSL, Haskell, Julia, Python, Ruby and Rust. However, the input representation may instead be a native code representation, for example a native code (i.e. a binary code) representation for a particular processor family such as any of the x86, x86-64, ARM, SPARC, PowerPC, MIPS, and m68k processor families. The input representation could also be a hardware description language (HDL). As is well-known, an HDL is a computer program language that may be used to program the structure, design and operation of electronic circuits. The HDL may, for example, be VHDL or Verilog, although it will be appreciated that many other HDLs exist and could be used in embodiments of the invention instead. As HDLs (and their uses and implementations) are well-known, they shall not be described in more detail herein, however, more detail can be found, for example, at http://en.wikipedia.org/wiki/Hardware_description_language, the entire disclosure of which is incorporated herein by reference.

When the above optimization and protection processes have been carried out, the item of software may be converted to an output representation. This stage of processing may also include further optimization and/or protection stages. In some embodiments, converting the item of software to an output representation comprises compiling (and typically also linking) the item of software into the output representation, for example into a native code representation. Further binary protection techniques may then also be applied to the item of software after the compiling and linking.

Before compilation, the item of software may be first converted from the first to the second intermediate representation and on to a source code representation which is passed to the compiler, or the item of software could be passed to the compiler directly in the first intermediate representation. In the first case, a compiler operating on the source code representation, such as a C/C++ compiler could be used. In the second case an LLVM compiler could be used if the first intermediate representation is LLVM IR. In any case, the compiler may be an optimizing compiler in order to provide a further level of optimization to the protected item of software.

Converting the item of software to an output representation may also comprise applying a binary rewriting protection tool to the item of software in the first intermediate representation before compiling, and/or such a tool may be applied at other times in the process.

Instead of compiling the item of software into a native code representation, the item of software may instead be converted into a script representation, and especially into a script representation which can be executed on an end user device. Conveniently, a JavaScript representation may be used for this purpose because such a script can be executed directly by a web browser on the end user device. More particularly, an asm.js representation, which is a subset of JavaScript, may be used, because asm.js is adapted for particularly efficient execution on end user devices. For example, if the first intermediate representation is the LLVM IR, then the Emscripten tool may be used to convert the item of software from the first intermediate representation to an asm.js representation.

If the input representation is a hardware description language then the output representation may typically be in a corresponding representation able to describe the electronic circuit at a more hardware oriented level, such as in a netlist. Where processing aspects such as compilation and linking are described herein, the skilled person will appreciate that when the invention is used with an HDL input representation, equivalent steps such as synthesis using appropriate tools may be used, and that suitable software tools applicable to HDL work may be used for the protection and optimization aspects of the invention. The output item of software is then a description of the electronic system with suitable obfuscation/protection and optimization steps applied.

The item of software may be any of a variety of items of software, such as an application for execution on a user device, a library, a module, an agent, and so forth. In particular, the item of software may be an item of security software such as a library, module or agent containing software for implementing security functions such as encryption/decryption and digital rights management functions. The method may be applied to two such items of software, and one of these items of software may use functionality in the other for example through a procedure call or other reference. Similarly, an item of software optimized and protected according to the invention may utilize or call security related or protected functionality in lower layers such as a systems layer or hardware layer. Similarly, the item of software may describe an electronic system, and be provided for input to embodiments of the invention in an HDL.

The invention also provides a method of protecting an item of software comprising applying one or more protection techniques to the item of software, and optimizing the item of software using one or more LLVM tools, and this aspect of the invention may be combined with the various options mentioned elsewhere herein. For example, the one or more protection techniques may be applied to the item of software using a protection component arranged to operate using an intermediate representation which is different to the LLVM intermediate representation, and the method may further comprise converting the item of software between one or more representations and the LLVM intermediate representation using LLVM tools. The method may be used to output a protected and optimized item of software in one of asm.js or a native code representation.

Following processing of an item of software as discussed above, the item of software may be delivered to one or more user devices for execution. The item of software may be delivered to user devices in various ways such as over a wired, optical or wireless network, using a computer readable medium, and in other ways.

The software for providing the discussed methods and apparatus may be provided on one or more computer readable media, over a network or in other ways, for execution on suitable computer apparatus, for example a computer device comprising memory and one or more processors, or a plurality of such devices, in combination with suitable input and output facilities to enable an operator to control the apparatus such as a keyboard, mouse and screen, along with persistent storage for storing computer program code for putting the invention into effect on the apparatus.

The invention may therefore also provide computer apparatus for protecting an item of software, comprising an optimizer component arranged to carry out optimization of the item of software in a first intermediate representation, such as LLVM IR, and a protector component arranged to carry out protection of the item of software in a second intermediate representation.

The apparatus may be arranged such that the optimizer component carries out optimization in the first intermediate representation of the item of software both before and after the protector component carries out protection in the second intermediate representation of the item of software.

The optimization component may comprise one or more LLVM optimization tools.

The protection component may be arranged to apply to the item of software one or more protection techniques comprising one or more of white box protection techniques, node locking techniques, data flow obfuscation, control flow obfuscation and transformation, homomorphic data transformation, key hiding, program interlocking and boundary blending.

The apparatus may further comprise an input converter arranged to convert the item of software from an input representation to LLVM IR, and the input representation may be one of a binary or native code representation, a byte code representation, and a source code representation. The apparatus may further comprise a compiler and linker arranged to output the optimized and protected item of software as binary code, and an output converter arranged to output the optimized and protected item of software as asm.js code.

The invention also provides a unified cloaking toolset comprising a protection component, an optimizer component, and one or more converters for converting between intermediate representations used by the protection component and the optimizer component. The optimizer component may comprise one or more LLVM optimizer tools, and the unified cloaking toolset may comprises one or more LLVM front end tools for converting from an input representation into LLVM intermediate representation. In some embodiments of the unified cloaking toolset, protection components and/or optimizer components may be provided to apply transformations to an item of software in more than one intermediate representation.

The unified cloaking toolset may also implement the various other aspects of the described embodiments as set out herein, for example with the protection component implementing one or more of the following techniques: white box protection techniques, node locking techniques, data flow obfuscation, control flow obfuscation and transformation, homomorphic data transformation, key hiding, program interlocking, and boundary blending; the unified cloaking toolset further comprising a compiler and linker arranged to compile and link into a native code representation; and the unified cloaking toolset further comprising an output converter for converting to an output representation which is a subset of JavaScript.

The invention also provides one or more items of software which have been optimized and protected using the described methods and/or apparatus, and such items of software may be provided, stored or transferred in computer memory, on a computer readable medium, over a telecommunications or computer network, and in other ways.

BRIEF DESCRIPTION OF THE DRAWINGS

Embodiments of the invention will now be described, by way of example only, with reference to the drawings of which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
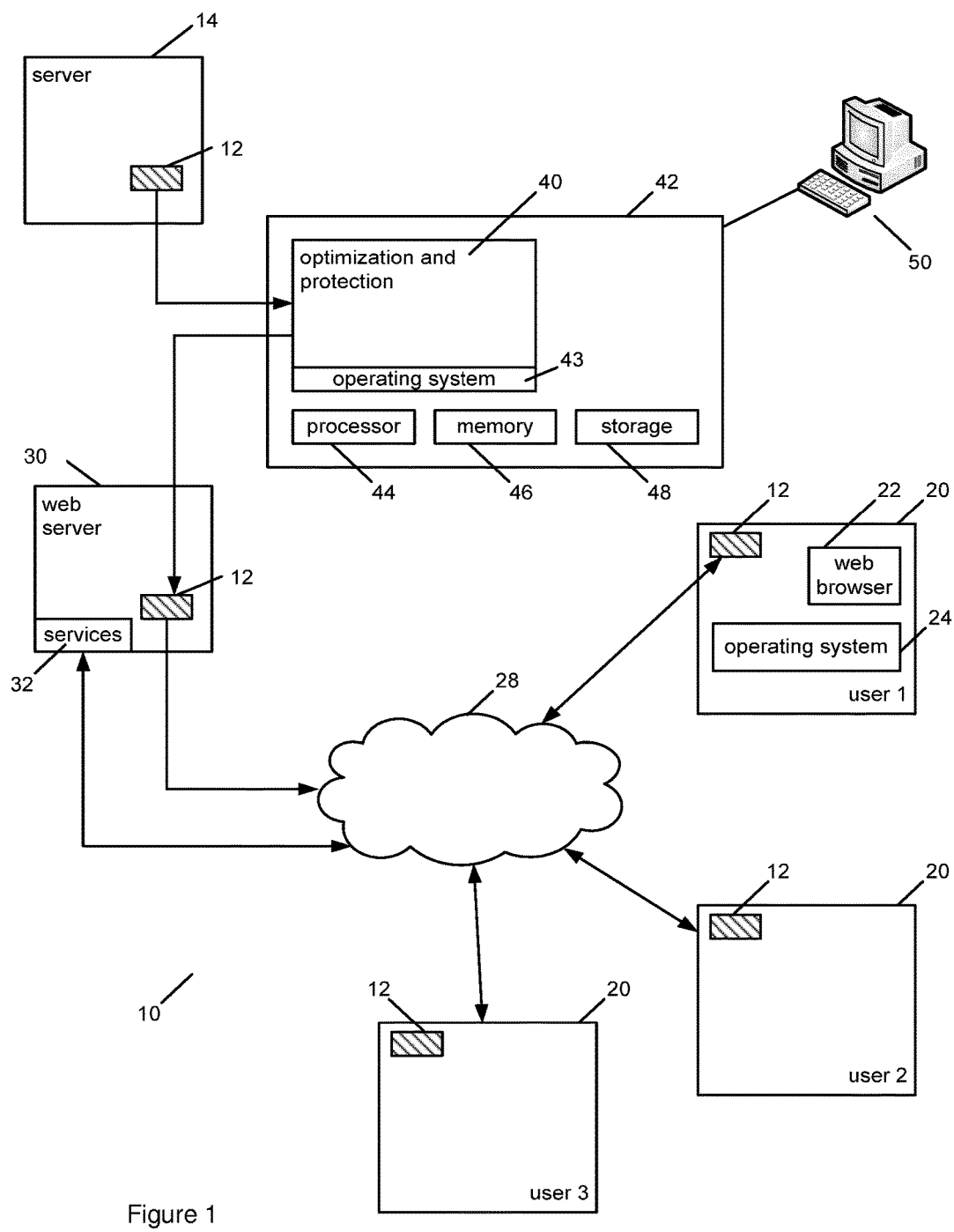
FIG. 1 schematically illustrates an example of a computer system including an optimization and protection toolset 40 according to the invention.

Referring now to FIG. 1 there is shown an exemplary computer system 10 within which the invention may be put into effect. An item of software 12 is provided, for example by a server 14 where it has been previously stored. The item of software 12 may be intended for various different purposes, but in the system of FIG. 1 it is an application (sometimes referred to as an app, depending on aspects such as how the application is delivered and how it is used in the context of the user device and wider operating environment) which is intended for execution and use on one or more of a plurality of user computers 20. The user computers 20 may be personal computers, smart phones, tablet computers, or any other suitable user devices. Typically, such a user device 20 will include an operating system 24 providing services to other software entities running on the user device such as a web browser 22. The item of software 12 may be delivered to the user device in various forms, but typically may be in the form of native executable code, a generic lower level code such as Java byte code, or a scripting language such as Java script. Typically, a generic lower level code or a scripting language software item 12 will be executed within or under the direct control of the web browser 22. An item of software 12 in native executable code is more likely to be executed under the direct control of the operating system 24, although some types of native code such as Google NaCl and PNaCl are executed within a web browser environment.

The item of software 12 of FIG. 1 may typically be delivered to the one or more user devices over a data network 28 such as the Internet by a remote web server 30, although other delivery and installation arrangements may be used. The illustrated web server, or one or more other servers, may also provide data, support, digital rights management and/or other services 32 to the user devices 20 and in particular to the item of software 12 executing on the user devices 20.

The item of software 12 may be vulnerable to attack and compromise in various ways on the user devices 20, whether before, during or after execution on those devices 20. For example, the item of software may implement digital rights management techniques which an attacker may try to compromise for example by extracting an encryption key or details of an algorithm which can enable future circumvention of the digital rights management techniques for that particular item of software, for particular digital content, and so forth.

The system 10 therefore also provides an optimization and protection toolset 40 which is used to optimize and protect the item of software 12 before delivery to the user devices 20. In FIG. 1 the optimization and protection toolset 40 acts upon the item of software 12 before the item of software 12 is delivered to the web server 30, but it could be implemented in the server 14, the web server 30, in a development environment (not shown) or elsewhere. The optimization and protection toolset 40 in FIG. 1 is shown as executing on a suitable computer apparatus 42 under the control of an operating system 43. The computer apparatus 42 will typically include one or more processors 44 which execute the software code of the optimization and protection toolset 40 using memory 46, under control of a user through input/output facilities 50. The computer apparatus 42 and functionality of the optimization and protection toolset 40 could be distributed across a plurality of computer units connected by suitable data network connections. Part or all of the software used to provide the optimization and protection toolset 40 may be stored in non-volatile storage 48, and/or in one or more computer readable media, and/or may be transmitted over a data network to the computer apparatus 42.

Note that the item of software 12 to be optimized and protected by aspects of the present invention may also be a component for use in with or by another item of software such as an application. To this end, the item of software 12 could be, for example, a library, a module, an agent or similar.

Figure 2:
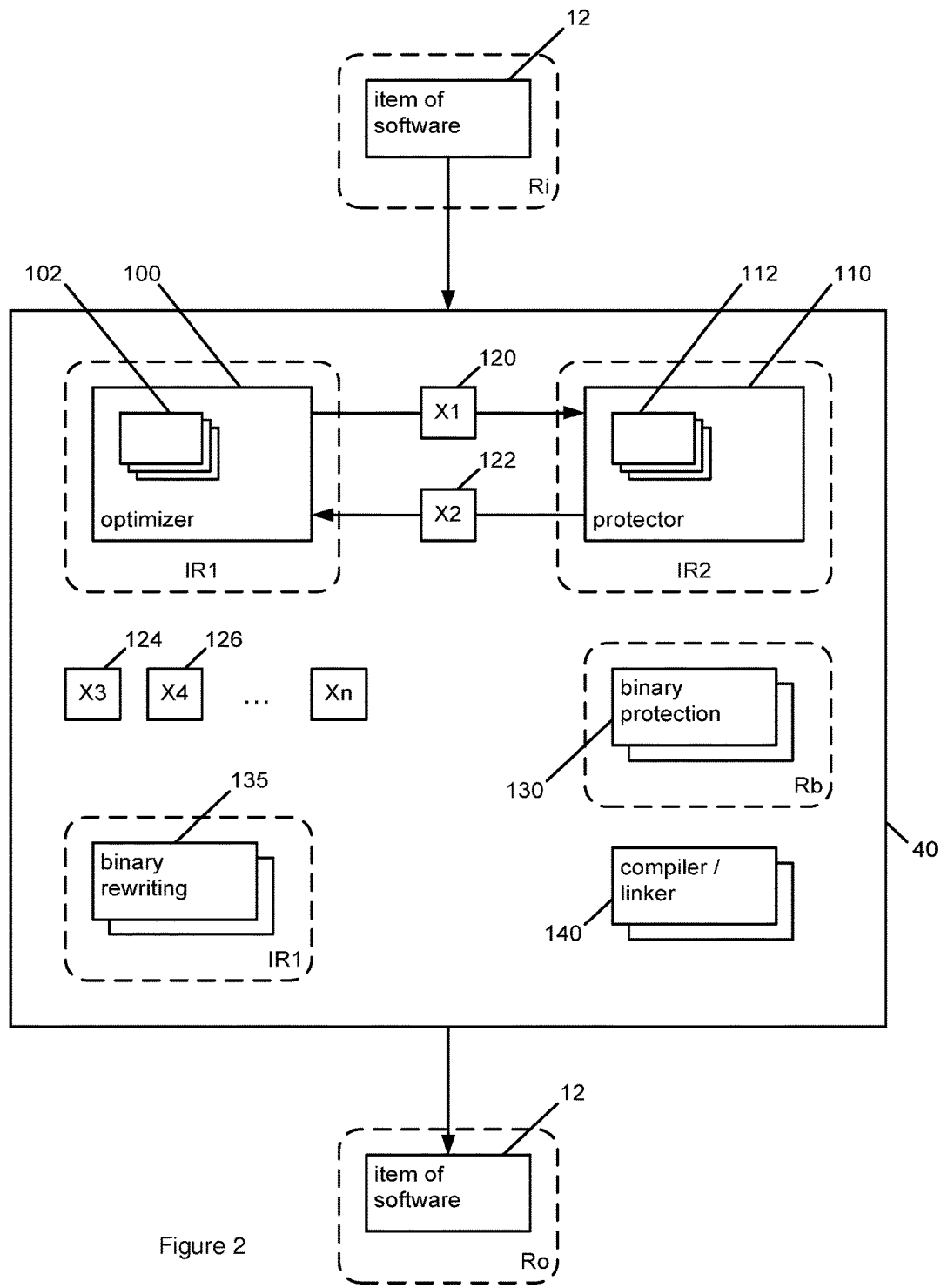
FIG. 2 illustrates in more detail an embodiment of the optimization and protection toolset 40 of FIG. 1.

An exemplary implementation of the optimization and protection toolset 40 is shown schematically in FIG. 2. The optimization and protection toolset 40 includes an optimizer component 100 and a protector component 110. The optimizer component 100 is adapted to implement optimization techniques on the item of software 12. The optimizer component 100 is configured to implement such techniques in a first intermediate representation IR1, so that the item of software 12 needs to be rendered into this first intermediate representation IR1 before the optimizer component 100 carries out optimization of the item of software. The protector component 110 is adapted to implement protection techniques on the item of software 12. The protection component is configured to implement such techniques in a second intermediate representation IR2, so that the item of software 12 needs to be rendered into this second intermediate representation before the protector component 110 carries out protection of the item of software 12. The first and second intermediate representations are different representations to each other. Typically, the protector component 110 is not able to operate on the item of software when in the first intermediate representation, and the optimizer component is not able to operate on the item of software when in the second intermediate representation.

Each of the optimizer component 100 and protection component 110 may be implemented as a plurality of subcomponents 102, 112 in the optimization and protection toolset 40. The subcomponents of a particular component may provide different and/or replicated functionality with respect to each other, for example such that the overall role of a component may be distributed in various ways within the software of the optimization and protection toolset 40.

The optimization and protection toolset 40 also provides a plurality of converters which are adapted to convert an item of software 12 from one representation to another. These converters include a first converter component 120 arranged to convert an item of software from the first intermediate representation IR1 used by the optimizer component 100 to the second intermediate representation IR2 used by the protector component 110, and a second converter component 122 arranged to convert an item of software from the second intermediate representation IR2 used by the protector component 100 to the first intermediate representation IR1 used by the optimizer component 110. Of course, the first and second converter components 120, 122 may be combined in a single function software unit such as a single module, executable or object oriented method if desired.

The item of software 12 is provided to the optimization and protection toolset 40 in an input representation Ri. This input representation may be one of any of a number of different representations, for example either the first or second intermediate representations IR1, IR2, or another representation such as a source code representation, a binary code representation, and so forth. Similarly, item of software 12 is output from the optimization and protection toolset 40 in an output representation Ro. This output representation may also be one of any number of different representations, for example either of the first or second intermediate representations IR1, IR2, or another representation such as a source code representation, a binary code representation, and so forth.

The optimization and protection toolset 40 may also include one or more further components, each arranged to operate on the item of software 12 in a particular representation. Such components may for example include a binary protection component 130 providing binary protection tools arranged to operate on the item of software 12 in a binary representation Rb, a binary rewriting protection component 135 providing binary rewriting protection tools arranged to operate on the item of software 12 in a binary representation or some other representation such as the first intermediate representation, and so forth.

In addition to the first converter component 120 and the second converter component 122, the optimization and protection toolset 40 is therefore also provided with other converter components 124, 126 also shown in FIG. 2 as X3 . . . Xn, which are used for converting the item of software 12 between various representations as required. By way of example, one such converter component 124, 126 may convert from a C/C++ source code representation to the second intermediate representation IR2, and another such converter component may convert from the second intermediate representation IR2 back to the C/C++ source code representation.

FIG. 2 also shows, as part of the optimization and protection toolset 40 one or more compiler or compiler and linker components 140 that can be used to compile and link the item of software 12 for example to convert the item of software 12 typically into a native or binary code representation, or another suitable target representation.

Examples of source code representations which could be used for the input representation Ri, and other representations within the optimization and protection toolset 40, include C, C++, Objective-C, C#, Java, JavaScript, Ada, Fortran, ActionScript, GLSL, Haskell, Julia, Python, Rubu, and Rust, although the skilled person will be aware of many others. The input representation Ri may instead be a native or binary code, a byte code and so forth, or possibly one of the first and second intermediate representations.

Examples of representations which could be used for the output representation Ro include native code representations for direct execution on a user device, including native code representations such as PNaCl and NaCl which are adapted for execution under the control of a web browser, byte code representations such as Java byte code, representations adapted for interpreted execution or run time compiling such as Java source code, script representations such as JavaScript and subsets of JavaScript such as asm.js, and possibly the first or second intermediate representations.

The first intermediate representation IR1 may typically be selected as an intermediate representation convenient for, adapted or otherwise selected for carrying out optimization techniques. In particular, the first intermediate representation may be LLVM IR (LLVM Intermediate Representation). The LLVM project, which is known to the skilled person and discussed for example at the LLVM website "http://llvm.org", provides a collection of modular and reusable compiler and tool-chain technologies that:

(i) introduce a well specified general purpose intermediate representation (LLVM IR) that supports a language-independent instruction set and type system;

(ii) provide the middle layers of a complete compiler system and infrastructure that take an item of software in LLVM IR and emit a highly optimised version of the item of software 12 in LLVM IR ready for compile-time, link-time, run-time and "idle-time" optimization of programs written in a wide range of source code representations;

(iii) support rich LLVM front-end tools for source code and other representations that include not only C and C++, but also other popular programming languages such as the source code languages mentioned above, as well as Java byte-code etc.;

(iv) by a set of LLVM back-end tools, supports many other popular platforms and systems at present, and will support more mobile platforms in the near future; and (v) work with OpenGL and low-end and high-end GPUs.

Other representations suitable for use as the first intermediate representation include Microsoft Common Intermediate Language (CIL).

The second intermediate representation IR2 may typically be selected as an intermediate representation convenient for, adapted or otherwise selected for carrying out protection techniques. The second intermediate representation may, for example be designed and implemented in such a manner that source code in particular languages, for example C and C++, can be readily translated into the second intermediate representation, and such that the source code in the same or similar languages can be readily constructed from the second intermediate representation.

Optimization techniques carried out by the optimizer may include techniques to increase the speed of execution of the item of software 12, to reduce execution idle time, reduce the memory required for storage and/or execution of the item of software 12, increase usage of the core or GPU, and similar. These and other optimization functions are conveniently provided by the LLVM project. Techniques to achieve such optimizations may include vectorization, idle time, constant propagation, dead assignment elimination, inline expansion, reachability analysis, protection break normal and other optimizations.

The aim of the protector component 110 is to protect the functionality or data processing of the item of software 12 and/or to protect data used or processed by the item of software 12. This can be achieved by applying cloaking techniques such as homomorphic data transformation, control flow transformation, white box cryptography, key hiding, program interlocking and boundary blending.

In particular, the item of software 12 after processing by the protector component 110 will provide the same functionality or data processing as before such processing—however, this functionality or data processing is typically implemented in the protected item of software 12 in a manner such that an operator of a user device 20 cannot access or use this functionality or data processing from item of software 12 in an unintended or unauthorised manner (whereas if the user device 20 were provided with the item of software 12 in an unprotected form, then the operator of the user device 20 might have been able to access or use the functionality or data processing in an unintended or unauthorised manner). Similarly, the item of software 12, after processing by the protector component 110, may store secret information (such as a cryptographic key) in a protected or obfuscated manner to thereby make it more difficult (if not impossible) for an attacker to deduce or access that secret information (whereas if a user device 20 were provided with the item of software 12 in an unprotected form, then the operator of the user device 20 might have been able to deduce or access that secret information).

For example:

The item of software 12 may comprise a decision (or a decision block or a branch point) that is based, at least in part, on one or more items of data to be processed by the item of software 12. If the item of software 12 were provided to a user device 20 in an unprotected form, then an attacker may be able to force the item of software 12 to execute so that a path of execution is followed after processing the decision even though that path of execution were not meant to have been followed. For example, the decision may comprise testing whether a program variable B is TRUE or FALSE, and the item of software 12 may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger) force the item of software 12 to follow path $P_F$ if the decision identified that B is TRUE and/or force the item of software 12 to follow path $P_T$ if the decision identified that B is FALSE. Therefore, in some embodiments, the protector component 110 aims to prevent (or at least make it more difficult) for the attacker to do this by applying one or more software protection techniques to the decision within the item of software 12.

The item of software 12 may comprise one or more of a security-related function; an access-control function; a cryptographic function; and a rights-management function. Such functions often involve the use of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some embodiments, the protector component 110 aims to prevent (or at least make it more difficult) for the attacker to identify or determine the one or more pieces of secret data by applying one or more software protection techniques to such functions within the item of software 12.

A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker. Similarly, it would be desirable to prevent the attacker from modifying the execution/control flow of the item of software, for example preventing the attacker forcing the item of software to take one execution path after a decision block instead of a legitimate execution path. There are numerous techniques, referred to herein as "white-box obfuscation techniques", for transforming the item of software 12 so that it is resistant to white-box attacks. Examples of such white-box obfuscation techniques can be found, in "*White-Box Cryptography and an AES Implementation*", S. Chow et al, Selected Areas in Cryptography, 9$^{th}$ Annual International Workshop, SAC 2002, Lecture Notes in Computer Science 2595 (2003), $p_{250}$-270 and "*A White-box DES Implementation for DRM Applications*", S. Chow et al, Digital Rights Management, ACM CCS-9 Workshop, DRM 2002, Lecture Notes in Computer Science 2696 (2003), $p_1$-15, the entire disclosures of which are incorporated herein by reference. Additional examples can be found in U.S. 61/055,694 and WO2009/140774, the entire disclosures of which are incorporated herein by reference. Some white-box obfuscation techniques implement data flow obfuscation—see, for example, U.S. Pat. Nos. 7,350,085, 7,397,916, 6,594,761 and U.S. Pat. No. 6,842,862, the entire disclosures of which are incorporated herein by reference. Some white-box obfuscation techniques implement control flow obfuscation—see, for example, U.S. Pat. Nos. 6,779,114, 6,594,761 and 6,842,862 the entire disclosures of which are incorporated herein by reference. However, it will be appreciated that other white-box obfuscation techniques exist and that embodiments of the invention may use any white-box obfuscation techniques.

As another example, it is possible that the item of software 12 may be intended to be provided (or distributed) to, and used by, a particular user device 20 (or a particular set of user devices 20) and that it is, therefore, desirable to "lock" the item of software 12 to the particular user device(s) 20, i.e. to prevent the item of software 12 from executing on another user device 20. Consequently, there are numerous techniques, referred to herein as "node-locking" protection techniques, for transforming the item of software 12 so that the protected item of software 12 can execute on (or be executed by) one or more predetermined/specific user devices 20 but will not execute on other user devices. Examples of such node-locking techniques can be found in WO2012/126077, the entire disclosure of which are incorporated herein by reference. However, it will be appreciated that other node-locking techniques exist and that embodiments of the invention may use any node-locking techniques.

Digital watermarking is a well-known technology. In particular, digital watermarking involves modifying an initial digital object to produce a watermarked digital object. The modifications are made so as to embed or hide particular data (referred to as payload data) into the initial digital object. The payload data may, for example, comprise data identifying ownership rights or other rights information for the digital object. The payload data may identify the (intended) recipient of the watermarked digital object, in which case the payload data is referred to as a digital fingerprint—such digital watermarking can be used to help trace the origin of unauthorised copies of the digital object. Digital watermarking can be applied to items of software. Examples of such software watermarking techniques can be found in U.S. Pat. No. 7,395,433, the entire disclosure of which are incorporated herein by reference. However, it will be appreciated that other software watermarking techniques exist and that embodiments of the invention may use any software watermarking techniques.

It may be desirable to provide different versions of the item of software 12 to different user devices 20. The different versions of the item of software 12 provide the different user devices 20 with the same functionality—however, the different versions of the protected item of software 12 are programmed or implemented differently. This helps limit the impact of an attacker successfully attacking the protected item of software 12. In particular, if an attacker successfully attacks his version of the protected item of software 12, then that attack (or data, such as cryptographic keys, discovered or accessed by that attack) may not be suitable for use with different versions of the protected item of software 12. Consequently, there are numerous techniques, referred to herein as "diversity" techniques, for transforming the item of software 12 so that different, protected versions of the item of software 12 are generated (i.e. so that "diversity" is introduced). Examples of such diversity techniques can be found in WO2011/120123, the entire disclosure of which are incorporated herein by reference. However, it will be appreciated that other diversity techniques exist and that embodiments of the invention may use any diversity techniques.

The above-mentioned white-box obfuscation techniques, node-locking techniques, software watermarking techniques and diversity techniques are examples of software protection techniques. It will be appreciated that there are other methods of applying protection to an item of software 12. Thus, the term "software protection techniques" as used herein shall be taken to mean any method of applying protection to an item of software 12 (with the aim of thwarting attacks by an attacker, or at least making it more difficult for an attacker to be successful with his attacks), such as any one of the above-mentioned white-box obfuscation techniques and/or any one of the above-mentioned node-locking techniques and/or any one of the above-mentioned software watermarking techniques and/or any one of the above-mentioned diversity techniques.

There are numerous ways in which the protector component 110 may implement the above-mentioned software protection techniques within the item of software 260. For example, to protect the item of software 12, the protector module 110 may modify one or more portions of code within the item of software 12 and/or may add or introduce one or more new portions of code into the item of software 220. The actual way in which these modifications are made or the actual way in which the new portions of code are written can, of course, vary—there are, after all, numerous ways of writing software to achieve the same functionality.

The binary protection component 130 is for accepting the software item 12 in the form of native or binary code or byte code after compiling by the compiler and linker 140, and applies binary protection techniques such as integrity verification, anti-debugging, code encryption, secured loading, and secured storage. The binary protection component then typically repackages the item of software 12 into a fully protected binary with necessary security data that can be accessed and used during its loading and execution on user devices 20.

Thus, for an item of software 12 in which a developer can access all source code, the optimization and protection toolset 40 can be used to apply source code protection tools to the source code of the application first in the second intermediate representation, using the protection component 112, and then to apply binary protection to the binary that is already protected by using source code protection techniques. Applying such protection to an item of software 12 in both source code and binary code domains results in a more effectively protected item of software 12.

Figure 3:
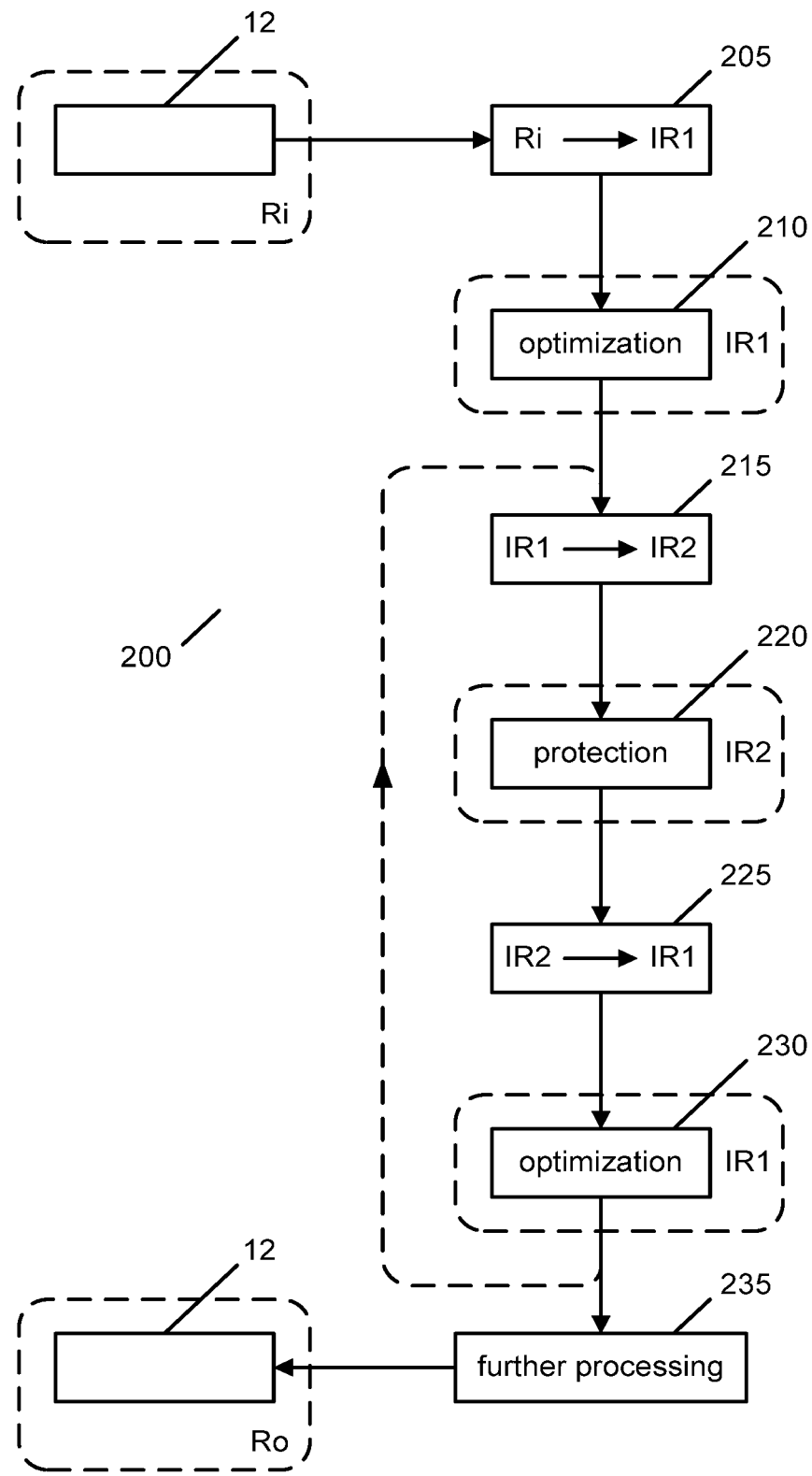
FIG. 3 provides a flow diagram of a method embodiment of the invention.

FIG. 3 illustrates some of the work flows 200 which may be implemented using the optimization and protection toolset 40. An item of software 12 is provided to the toolset in an input representation Ri. This representation might typically be a source code or binary code representation as discussed above. The item of software is converted to the first intermediate representation at step 205. This might involve using a single converter component 120-128, or two or more converter components. Typically, the item of software might be converted from the input representation Ri directly into the first intermediate representation, or from the input representation Ri into the first intermediate representation via another representation such as the second intermediate representation.

The item of software 12 in the first intermediate representation IR1 is then optimized at step 210 using the optimizer component 100 of FIG. 2, and then converted to the second intermediate representation IR2 at step 215, using the first converter 120 of FIG. 2. The item of software 12 in the second intermediate representation IR2 is then protected at step 220 using the protector component 110 of FIG. 2, and then converted back to the first intermediate representation IR1 at step 225 using the second converter 122 of FIG. 2.

The item of software 12 in the first intermediate representation IR1 is then optimized again at step 230 using the optimizer component 100 of FIG. 2. It may then be subject to various aspects of further processing at step 235 before being output in the output representation Ro. Aspects of further processing may include one or more of compiling and linking, binary protection, conversion to other representations and so forth.

A broken flow arrow in the figure indicates that after the second optimization step 230, the work flow 200 may return to steps 215 for conversion back to the second intermediate representation, and one or more further steps of protection and optimization.

The work flow 200 of FIG. 3 can be varied in different ways. For example, the item of software 12 may be optimized just once, either before or after the step of protection 220, and the step of further processing 235 may be omitted or include multiple steps. Either protection or optimization may be carried out before the other, and any number of further steps of optimization and protection may be carried out. Conversion from the input representation Ri to the representation used for optimization IR1 may include multiple conversion steps for example a conversion from Ri to IR2 followed by a conversion from IR2 to IR1. The further processing step 235 may include other optimization and/or protection steps, for example a binary rewriting protection step.

More specific examples of how the optimization and protection toolset 40 of FIG. 2 and the work flows such as those of FIG. 3 may be implemented will now be described. In these particular examples, the first intermediate representation is typically the LLVM IR discussed above. This enables the invention to expand the scope of native application protection for better performance and security, and also to open up new security possibilities for much larger scope of operation of the optimization and protection toolset 40.

It has become apparent to the inventors that there are conflicting issues between security and performance in preparing an item of software 12 for distribution to a plurality of user devices 20. In general, protected software introduces necessary redundancy and overhead that will slow down the performance of the software in the protected, and especially cloaked form. The more protection techniques that are applied to the item of software, the more significant is the impact on performance. Therefore, performance and security need to be balanced.

Typical protection techniques may transform static program dependencies into partially static and partially dynamic dependencies. This prevents completely static attacks that are usually much easier to carry out than dynamic attacks. However, it also introduces a limitation that these protection techniques can break certain optimization capabilities which rely on analysis of properties of static dependencies. Because of this limitation, protection and optimization strategies need to make choice between less security/protection but better optimization for example in terms of execution speed and/or smaller program size, and more security/protection but less optimization.

Figure 4:
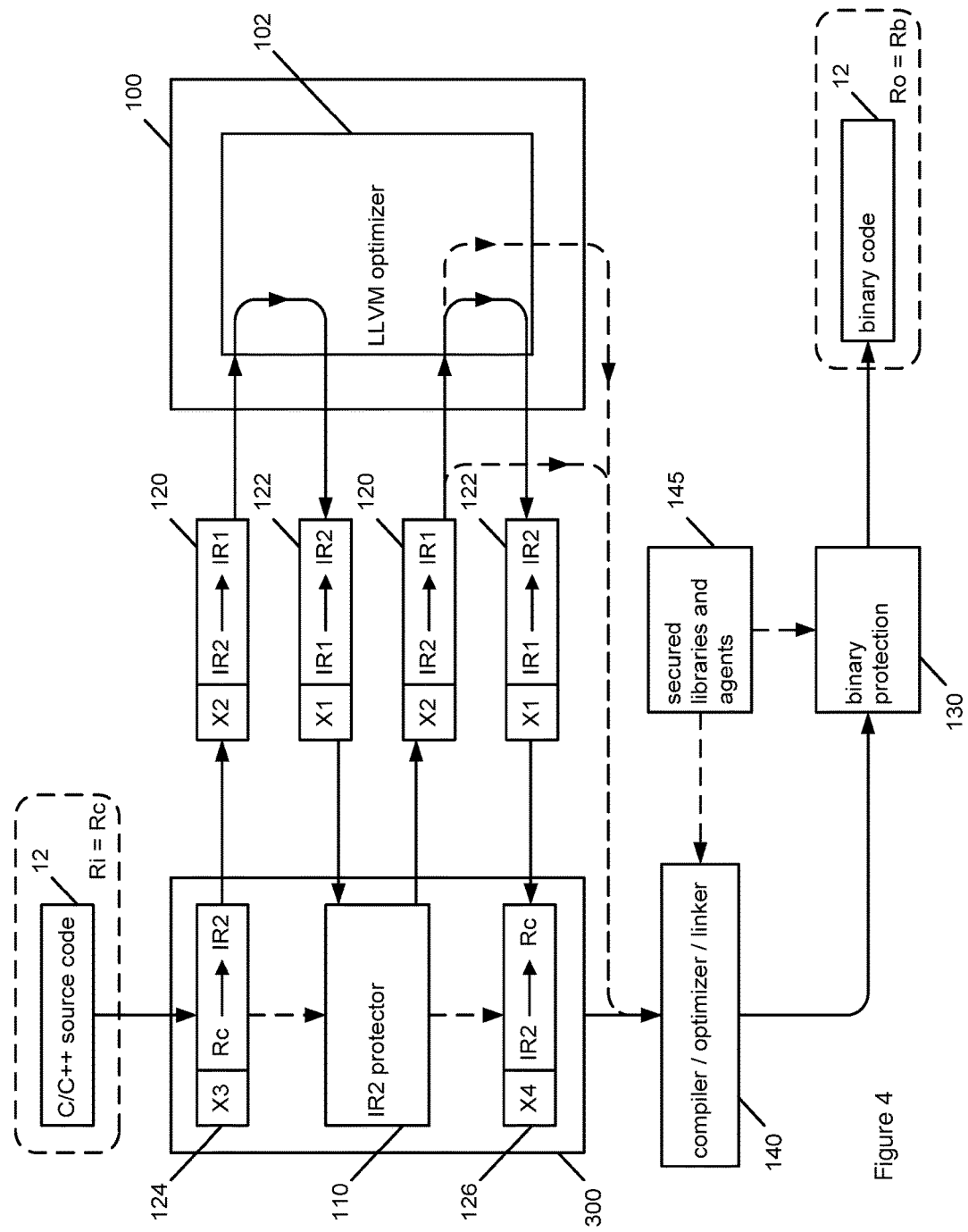
FIG. 4 illustrates a work flow which can be implemented by the optimization and protection toolset 40 of FIG. 2.

FIG. 4 illustrates a work flow which can be implemented using the optimization and protection toolset 40. The item of software 12 is provided to the optimization and protection toolset 40 in an input representation Ri which is a C/C++ source code representation Rc. This is passed to a toolset component grouping 300 which consists of a converter X3 from representation Rc to the second intermediate representation IR2, the protector component 110, and a converter X4 from the second intermediate representation IR2 back to the source code representation Rc. If no LLVM optimization is to take place, then the item of software 12 can be passed through each of these functions sequentially to protect the item of software 12 before being passed to the compiler, optimizer and linker 140, and then on to binary protection component 130 to output the item of software 12 in an output representation which is a native/binary code representation Rb. A set of secure libraries and agents 145 is also provided for use in compiling/linking the item of software 12, and if required for use by the binary protection component 130.

The toolset component grouping 300 is complemented by the optimizer component 100, shown here for the purposes of clarity as a single subcomponent 102 implementing one or more LLVM optimization tools, although multiple subcomponents 102 could be used for example with a different subcomponent, multiple subcomponents, or different combinations of subcomponents being used at each stage of optimization. The X1 and X2 converters of FIG. 2 are then used to convert the item of software 12 from the second intermediate representation formed using the X3 converter 124 and/or as output by the protector component 110 in the toolset component grouping 300, to the first intermediate representation for use by the LLVM optimization tools, and to convert the item of software 12 following optimization by the LLVM optimization tools for protection by the protector component 110 and/or for conversion by the X4 converter back to the Rc representation.

Some alternative work flow pathways are illustrated in FIG. 4 using broken lines. For example, following processing by protector component 110 and conversion to the IR1 representation, the item of software 12 can be sent directly to the compiler, optimizer and linker 140 without a second step of processing by the optimizer component 100. Similarly, after a second step of processing by the optimizer component 100, the item of software 12 can be sent directly to the compiler, optimizer and linker 140 without conversion by the X1 and X4 converters, if the compiler, optimizer and linker 140 is able to handle input in the first intermediate representation.

The X1 and X2 converters therefore provide a bridge between the domain of the protection techniques provided by the protector component in the second intermediate representation, and the domain of the optimization techniques provided by the LLVM optimization tools in the first intermediate representation, thereby integrating these two areas of operation of the optimization and protection toolset 40. This approach also helps to resolve the conflict between protection and optimization discussed above, because the optimization and protection toolset 40 can leverage the power of the available LLVM optimization tools and techniques, to provide optimization both before and after the protection techniques are applied by the protection component 110. By enabling optimization at multiple levels, it is possible to remove the limitation between security and performance so that both better security and improved performance can both be achieved for the same item of software 12.

Figure 5:
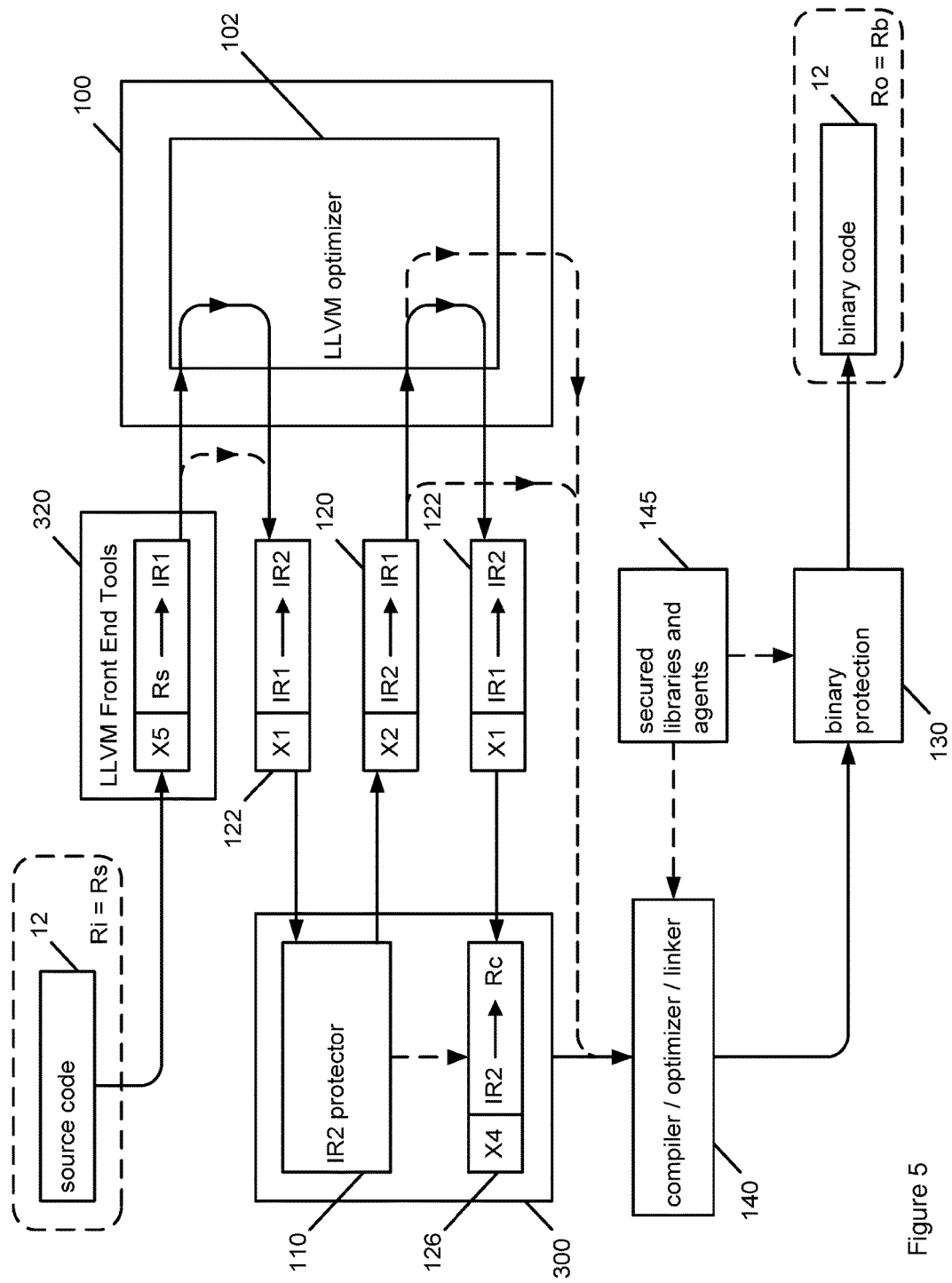
FIG. 5 illustrates a work flow similar to that of FIG. 4 but within which an input item of software in a source code representation is converted to LLVM IR using LLVM front end tools.

FIG. 5 illustrates another work flow which can be implemented using the optimization and protection toolset 40. In this figure, the item of software 12 is provided to the optimization and protection toolset 40 in an input representation Ri which is a source code representation Rs. The source code representation Rs could be, for example, Objective-C, Java, JavaScript, C#, Ada, Fortran, ActionScript, GLSL, Haskell, Julia, Python, Ruby or Rust. The item of software 12 is passed to a converter X5 which converts the source code representation Rs into the first intermediate representation. The converter X5 may be provided as part of a set of LLVM front-end tools 320 providing conversion to LLVM IR from a wide variety of source code representations. The item of software 12 now in LLVM IR can be passed to the optimizer component 100 for a first step of optimization by the LLVM optimizer tools, or directly to the X1 converter (as shown by a broken line) for conversion to the second intermediate representation before being passed to the protector component 110. The remaining parts of FIG. 5 correspond to FIG. 4. Note that the toolset component grouping 300 of FIG. 5 is not shown as including the X3 converter because it is not necessary in the work flow of FIG. 5, but it could nonetheless be included in this grouping if desired.

Since the very rich set of available LLVM front-end tools 320 can convert many different languages into LLVM IR, and thereby leverage LLVM compilation facilities to obtain sophisticated analysis and better performance, these LLVM front-end tools can be used, as illustrated in FIG. 5, to extend the front-end capabilities of the optimization and protection toolset 40 to convert program source code in a large set of programming languages into the second intermediate representation via the first intermediate representation where the protection techniques of the protector component 110 can be applied.

Figure 6:
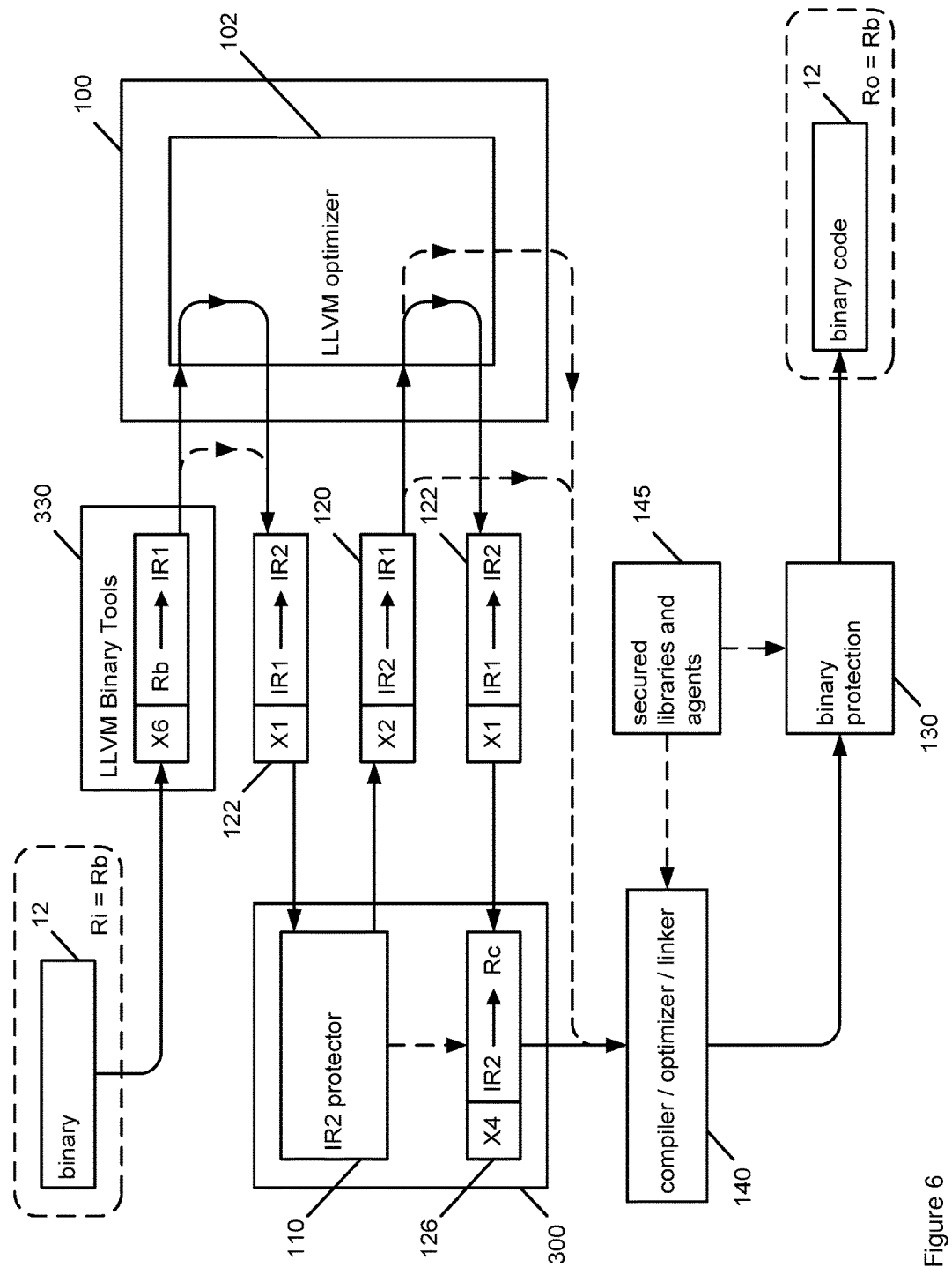
FIG. 6 is similar to FIG. 5 but with an input item of software in a binary or native code representation.

FIG. 6 illustrates another work flow which can be implemented using the optimization and protection toolset 40. In this figure, the item of software 12 is provided to the optimization and protection toolset 40 in an input representation Ri which is a native/binary representation Rb, for execution on particular platform or class of user device 20. The binary representation Rb could be, for example, any of x86, x86-64, ARM, SPARC, PowerPC, MIPS, and m68k binary representations. The item of software 12 is passed to a converter X6 which converts the binary representation Rb into the first intermediate representation. The converter X6 may be provided as part of a set of LLVM binary tools 330 providing conversion to LLVM IR from a wide variety of binary representations. The remaining parts of FIG. 6 correspond to FIGS. 4 and 5.

By using LLVM binary tools in this way, an item of software 12 in native/binary code can be converted into LLVM IR form, before being converted in the second intermediate representation for input into the protector component 300 for protection techniques such as cloaking to be applied. If the output representation Ro is a binary code for a different target platform than that of the input representation binary code, the optimization and protection toolset 40 can easily be used to reach this goal of an output for a different target platform at the same time as applying the required protection techniques, by suitable configuration of the complier, optimizer and linker 140.

LLVM compiler middle layer tools include sophisticated program analysis capabilities, such as more precise alias analysis, pointer escape analysis, and dependence analysis, that can provide rich program properties and dependencies that can be used to transform programs for different purposes. The binary rewriting protection component 135 illustrated in FIG. 2 provides one or more binary rewriting protection tools which accept an item of software 12 in LLVM IR form, make obfuscating transformations by leveraging LLVM's program analysis functionalities, and results in a more secure version of the item of software 12 in the LLVM IR.

The binary rewriting protection component 135 can enhance protection of the item of software 12 in a number of different ways, including stand-alone binary rewriting protection, binary rewriting protection with binary protection tools, and binary rewriting protection with both source cloaking tools and binary protection tools:

Stand-alone binary rewriting protection—generally, binary protection protects binary code in binary forms, and some such protection techniques need to work on binary representations, for example integrity verification, secure loading, and dynamic code encryption. Also, binary protection can apply certain kinds of transformations if required program information becomes available. However, existing binary protection tools tend to have limited support of analysis capacity such that very limited binary transformations can be done directly in binary form. Instead, a binary rewriting protection tool can be adapted to act on an item of software 12 in an intermediate representation such as LLVM IR, in which much more sophisticated program analysis supports can be leveraged, thereby applying many transformation techniques that cannot be easily applied directly to software in a binary representation.

In a stand-alone mode, an item of software 12 in an unprotected binary code representation is translated into the LLVM IR using one or more LLVM binary tools 330, and then the binary rewriting protection component 135 is used to apply certain program transformations to the item of software 12 by interacting with LLVM program analysis tools. The rewritten item of software 12 in LLVM IR is then translated into a protected binary code representation by using an LLVM IR to binary converter, a compiler, optimizer and linker, or in other ways.

Binary rewriting protection with binary protection tools—in this mode, an item of software 12 provided to the optimization and protection toolset 40 in a binary code representation can be obfuscated into a protected binary representation by using the binary rewriting protection component 135. The item of software 12 can then be further protected by using general binary protection tools such as provided by binary protection component 130 of FIG. 2. Combining different layers of protection together in this way by using both binary rewriting protection and binary protection leads to a more secure item of software 12.

Figure 7:
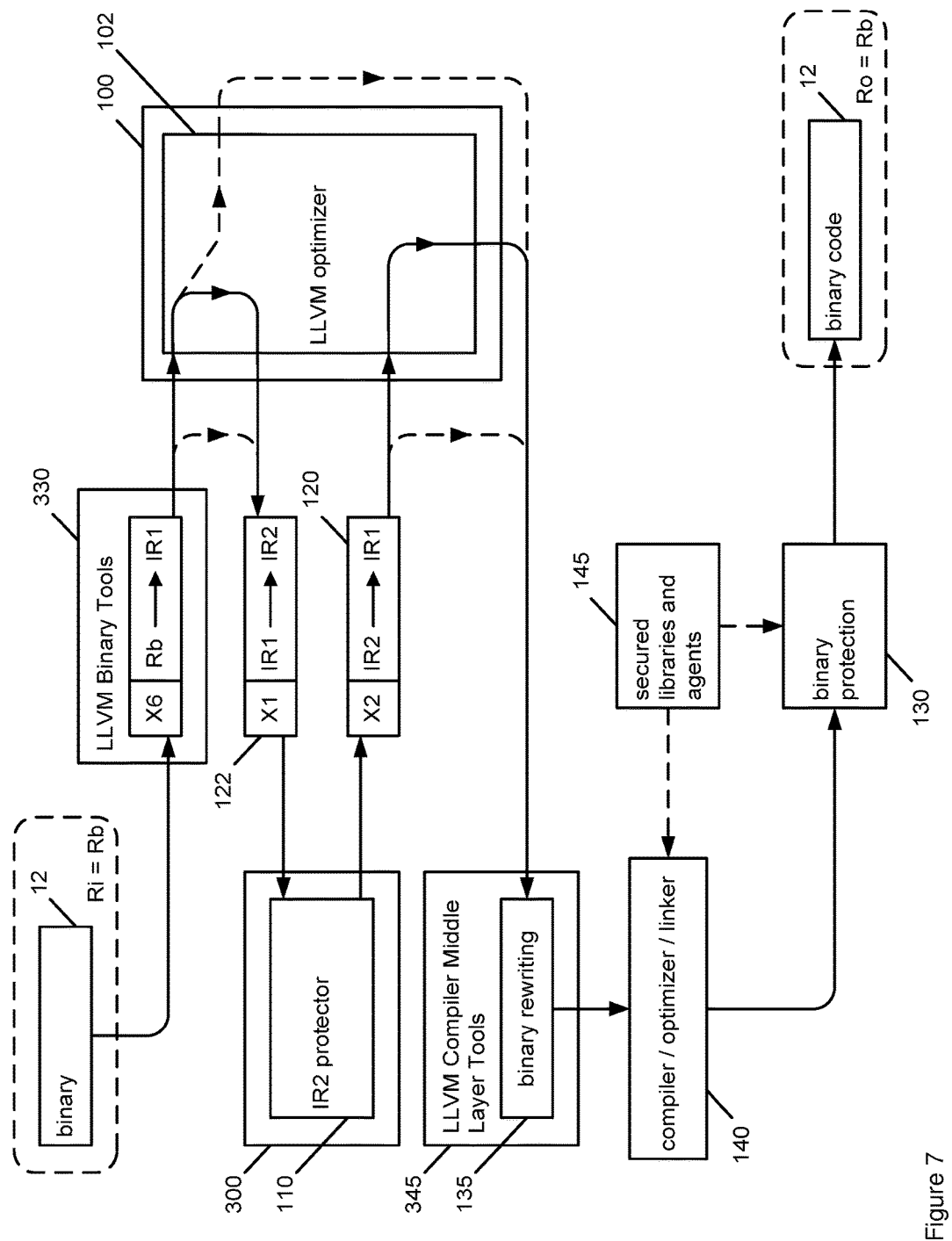
FIG. 7 illustrates a work flow similar to that of FIGS. 4 to 6 but within which LLVM compiler middle layer tools are used to implement binary rewriting protection of the item of software in the first intermediate representation.

Binary rewriting protection with both source level protection and binary protection—in general, protection processing of source code type representations such as the second intermediate representation discussed above can provide more comprehensive and deeper data flow and control flow protection. FIG. 7 illustrates this using a work flow similar to that of FIG. 6 in which LLVM binary tools are used to convert an item of software 12, provided to the optimization and protection toolset 40 in a binary representation, to the first intermediate representation. Additionally in FIG. 7, the item of software 12 output from the optimizer component 102, or alternatively directly from converter X2, after action of the protector component 112, is directed to the binary rewriting protection tool 135. After operation of the binary rewriting protection tool 135 the item of software 12 is then passed on to the compiler, optimizer and linker 140 as previously described. The binary rewriting protection tool 135 is an example of an LLVM compiler middle layer tool 345 which can be used in this arrangement. As shown by broken lines in FIG. 7, the item of software 12 may instead be directed straight to the binary rewriting protection tool after the first optimization without processing by the protector component 112 or a second stage of optimization, or may be processed in a manner which omits either the first or second steps of optimization.

A web application is an application that uses a web browser as a client environment. A web application is typically coded in a browser-supported programming language such as JavaScript, combined with a browser-rendered markup language such as HTML, and depends on its host web browser to render it executable. "asm.js" is a restricted subset of JavaScript, discussed for example at the website http://asmjs.org. "asm.js" supports C-like computations, but because it is a subset of JavaScript it runs correctly in any web browser supporting JavaScript, not requiring any further special support. The subset used by asm.js makes it easy to recognize low-level operations using trivial methods of type inference. "asm.js" does depend on the extensions needed to support WebGL (buffers and type arrays such as UInt32, INt 16 and so forth) in order to support low-level structures, arrays, etc., but these are usually available in the hosting web browser. That a JavaScript program conforms to the "asm.js" representation can be marked in the JavaScript file using the "use asm" directive. The hosting web browser can then ignore this directive if explicit support for "asm.js" is absent, or can check the program for compliance with the "asm.js" representation if support is available. If support is available in the web browser, then asm.js code can run at greatly increased speed and efficiency compared with usual JavaScript, typically through compilation of the asm.js code into a native binary code representation.

Tools are provided in the prior art for converting source code representations such as C and C++ into the asm.js representation. One such tool chain would consist of the Clang tool (see http://clang.llvm.org which converts C and C++ representations into the LLVR IR, and the Emscripten tool (see https://github.com/kripken/emscripten) which converts LLVM IR into the asm.js representation. LLVM optimization tools can be applied as part of this tool chain to effect optimization before application of the Emscripten tool.

Figure 8:
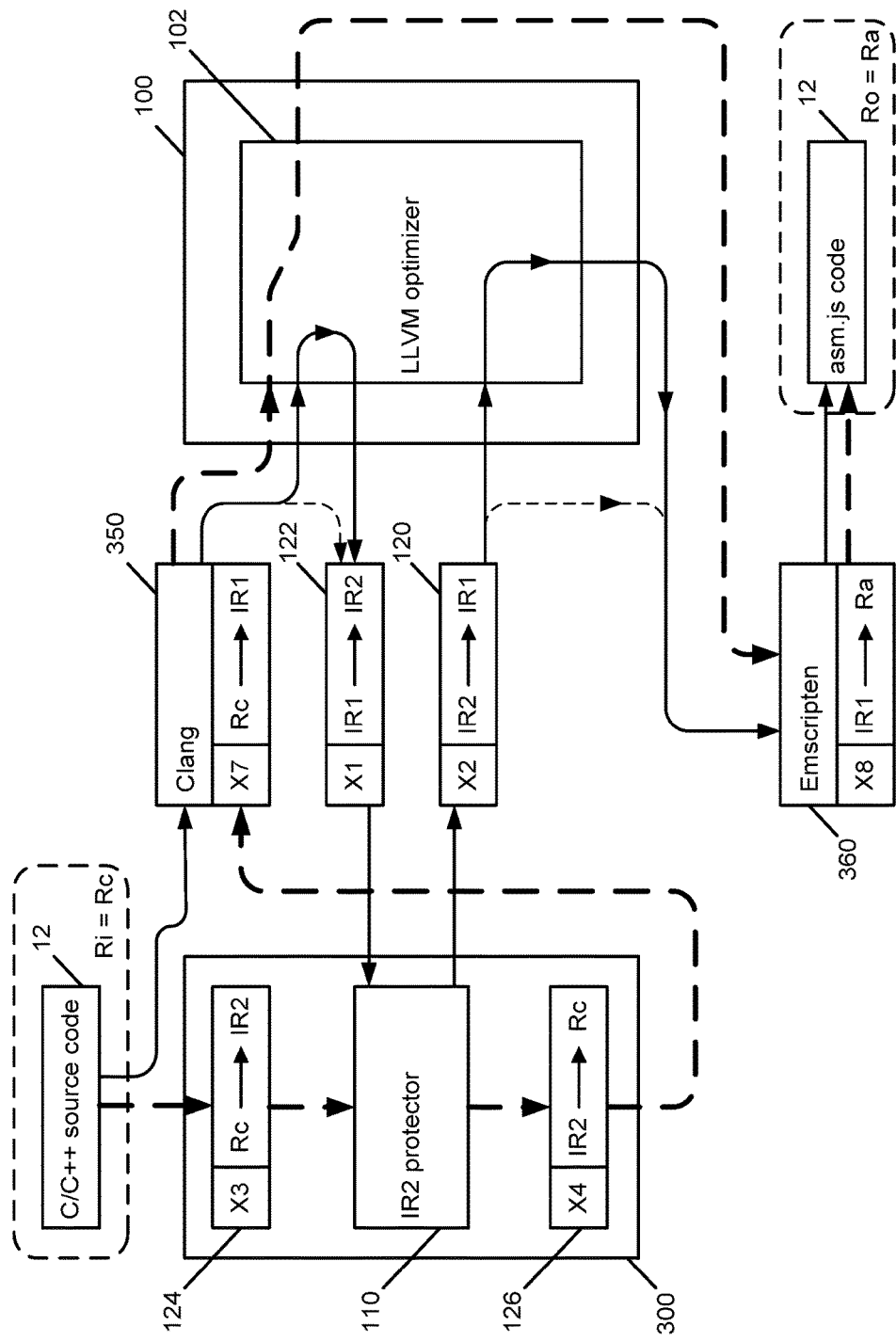
FIG. 8 shows a work flow which may be implemented using the optimization and protection toolset of FIG. 2, in which the output representation is an asm.js or other executable script representation.

FIG. 8 illustrates how the optimization and protection toolset 40 can be used to optimize and protect an item of software 12 provided in a C/C++ source representation Rc, and output the item of software 12 in an asm.js representation Ra. The work flows of FIG. 8 follow similar schemes to those of FIGS. 4 to 7.

According to a first work flow route shown in heavy broken lines, the item of software 12 input in the C/C++ representation Rc is passed to the toolset component grouping 300 where it is converted to the second intermediate representation by converter X3, then protected by protection component 112, and then converted back to the C/C++ representation Rc. The protected item of software 12 is then passed to a Clang component 350 denoted as X7 which converts the C/++ source code representation Rc to the first intermediate representation IR1, typically LLVM IR. This representation is passed to the LLVM optimizer 310 forming part of the optimizer component 102, and then to an Emscripten component 360 denoted as X8 which converts the first intermediate representation to an asm.js representation Ra for output.

According to a second work flow route generally shown in solid lines, the item of software 12 input in the C/C++ representation Rc is passed first to the Clang component 350 denoted as X7 which converts the C/++ source code representation Rc to the first intermediate representation IR1, typically LLVM IR. This representation is passed to the LLVM optimizer 310 forming part of the optimizer component 102, and then to the first converter 122 denoted as X1 for conversion to the second intermediate representation for passing to the protector component 112. After processing by the protector component 112 the item of software 12 is passed to the second converter 120 denoted as X2 for conversion back to the first intermediate representation and then to the optimizer component 102 for a second stage of optimization. Finally, the item of software 12 is passed to the Emscripten component 360 denoted as X8 which converts the first intermediate representation to an asm.js representation Ra for output. Some alternatives within this work flow are shown in light broken lines, by which either the first or second step of optimization can be omitted.

By using the optimization and protection toolset 40 to implement C/C++ to asm.js conversion including protection and optimization it is possible to both develop new items of software 12 such as web apps in C/C++ for delivery to user devices in asm.js, and also to migrate existing items of software 12 in C/C++ into protected and optimized asm.js representations. Because asm.js enabled browsers can perform much stronger run-time optimization than if general JavaScript is used, the optimized and protected asm.js item of software 12 can be run at high speed. Indeed, tests by the inventors have shown that items of software 12 written in C/C++ and processed using the optimization and protection toolset 40 as discussed above to form optimized and protected asm.js code can perform better than a corresponding item of software 12 originally written in native code. This indicates excellent performance of the optimizers used in the optimization and protection toolset 40.

Although FIG. 8 shows the use of the optimization and protection toolset 40 to accept an item of software 12 input in C or C++, other source code representations such as Object-C, Java, JavaScript, C# and so forth can be used for the input representation Ri by using a different LLVM front end tool in place of the Clang tool 350 shown in FIG. 8, with subsequent steps of optimization and protection as already discussed and final conversion to the asm.js representation Ra. This opens up many new opportunities to migrate existing applications in languages other than C/C++ into web applications, or to develop new web applications in these languages that can be made available for use in browser environments.

Similarly, the work flows shown in FIG. 8 can be changed to accept an input item of software 12 in a native/binary representation Rb by replacing the Clang tool 350 with one or more LLVM binary tools 330 (for example as already discussed in connection with FIG. 7). A significant advantage of such a work flow is that existing items of software 12 in native code representations can be migrated into web apps for running in browser environments (for example HTML5) with the enhanced security provided by the protection component 112, while maintaining performance for example in terms of speed of execution.

FIG. 9 illustrates again the optimization and protection toolset 40 already shown in FIG. 2, but now with some other specific detail and aspects reflecting the work flows discussed in connection with FIGS. 3-8. For example, the optimization and protection toolset 40 illustrated in FIG. 9 makes specific reference to use of LLVM IR as the first intermediate representation. Adopting a technology framework such as LLVM can help in applying software protection capabilities oriented towards or originally written for C/C++ source code structures and similar, to the protection of items of software 12 provided in other source code representations, binary code representations and similar.

Figure 9:
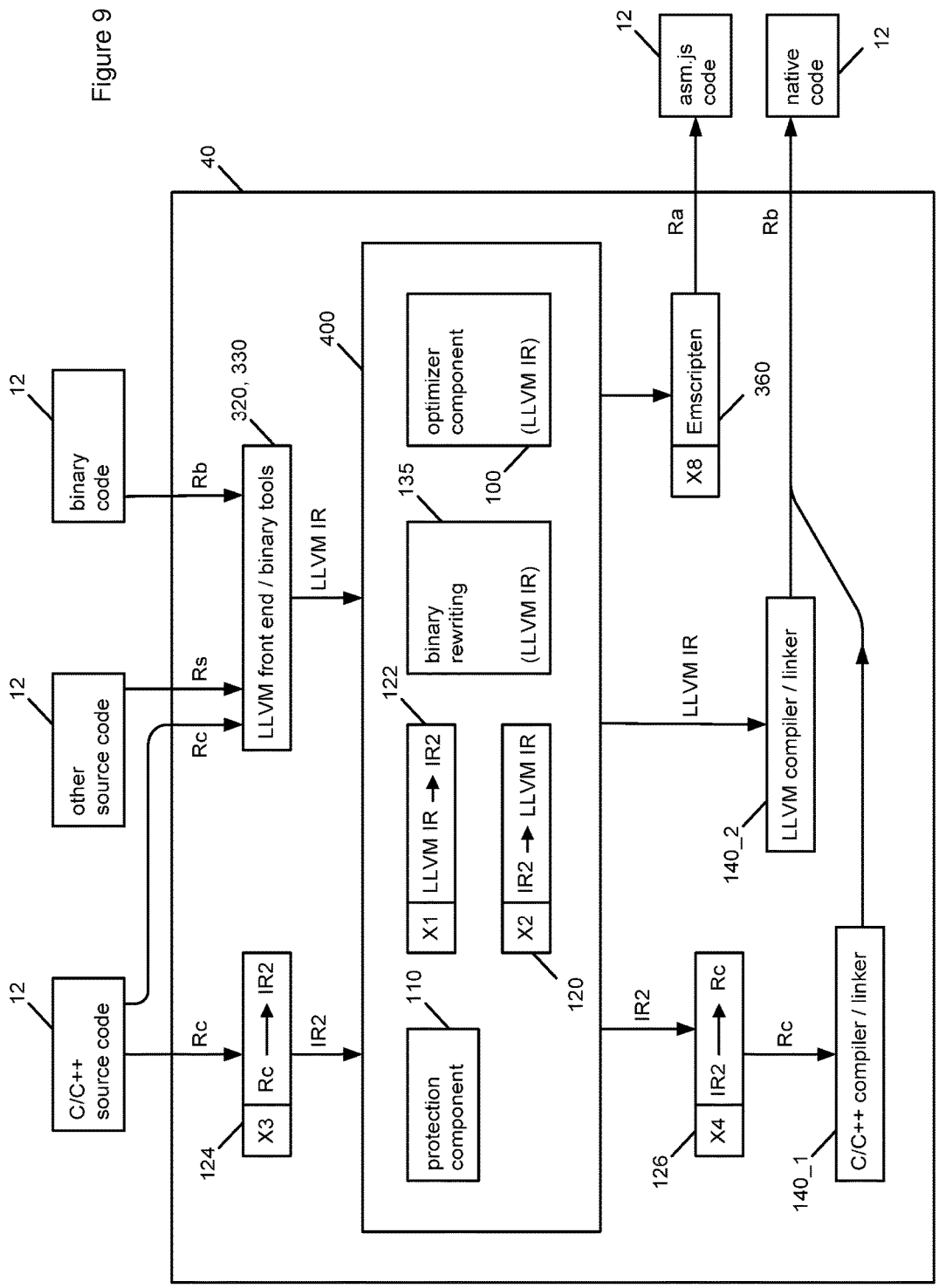
FIG. 9 shows schematically the optimization and protection toolset of FIG. 2 with some further variations and details.

FIG. 9 therefore shows that an item of software 12 for input to the optimization and protection toolset 40 can be in C/C++ source code (representation Rc), another source code (representation Rs) or a native/binary code (representation Rb). If the input item of software 12 is in a C/C++ source code representation, then it can be converted to the second intermediate representation which is used by the protection component 112 using the X3 converter. All of the different representations of the input item of software 12 can be converted to the first intermediate representation which is the LLVM IR using LLVM front end/binary tools 320,330.

The input item of software 12 can then be processed in various ways by elements of the unified toolset grouping 400. These components include the protection component 110 which operates on the item of software 12 in the second intermediate representation, the binary rewriting protection component 135 which operates on the item of software 12 in the LLVM intermediate representation, and the optimizer component 102 which operates on the item of software 12 in the LLVM intermediate representation. The unified toolset grouping 400 also includes at least the first and second X1, X2 converters 122, 120 which convert between the LLVM intermediate representation and the second intermediate representation, so that any of the components of the unified toolset grouping 400 can act on the item of software 12.

After processing by the components of the unified toolset grouping 400, the item of software 12 can be passed to various components for further processing in order to form the item of software 12 in the relevant output representation. If passed from the unified toolset grouping 400 in the second intermediate representation the item of software 12 can be converted back to the C/C++ source code representation Rc using converter X4 126 for compiling and linking by C/C++ compiler and linker component 140-1. If passed from the unified toolset grouping 400 in the LLVM intermediate representation the item of software 12 can be compiled and linked by the LLVM compiler and linker 140-2. In both cases the output from the optimization and protection toolset 40 is then the item of software 12 in a native/binary code representation Rb. Alternatively, the item of software 12 can be passed from the unified toolset grouping 400 in the LLVM intermediate representation to the converter X8 provided by the Emscripten tool 360 so that the output from the optimization and protection toolset 40 is then the item of software 12 in the asm.js representation Ra.

Using the optimization and protection toolset 40 of FIG. 9, an item of software 12 such as an application or software module or library, no matter what language has been used to implement it, can be protected using the same protection component 110 and the toolset of cloaking and other techniques which may be implemented by that component 110. If the item of software 12 is output from the optimization and protection toolset 40 in native/binary code, this can be run in native execution environments (including PNaCl), or if output in JavaScript or asm.js, this can be run in web browser environments. This is achieved in the optimization and protection toolset 40 of FIG. 9 by operating the components of the unified toolset grouping 400 in two different intermediate representations, with the protection component 110 operating on the item of software 12 in the second intermediate representation, and at least the optimizer component 100 operating on the item of software 12 in the LLVM intermediate representation.

The arrangements illustrated in FIGS. 2-9 mostly make use of a first intermediate representation for carrying out optimization of an item of software, and a second intermediate representation for carrying out protection of the item of software. However, referring to FIG. 10, more generally embodiments of the invention may also use the first representation for carrying out protection of the item of software, and/or the second representation for carrying out optimization of the item of software. Additionally, although the arrangements of FIGS. 2-9 make use of two intermediate representations, embodiments of the invention may make use of three of more intermediate representations, with each intermediate representation being used for one or both of optimization and protection of an item of software.

Figure 10:
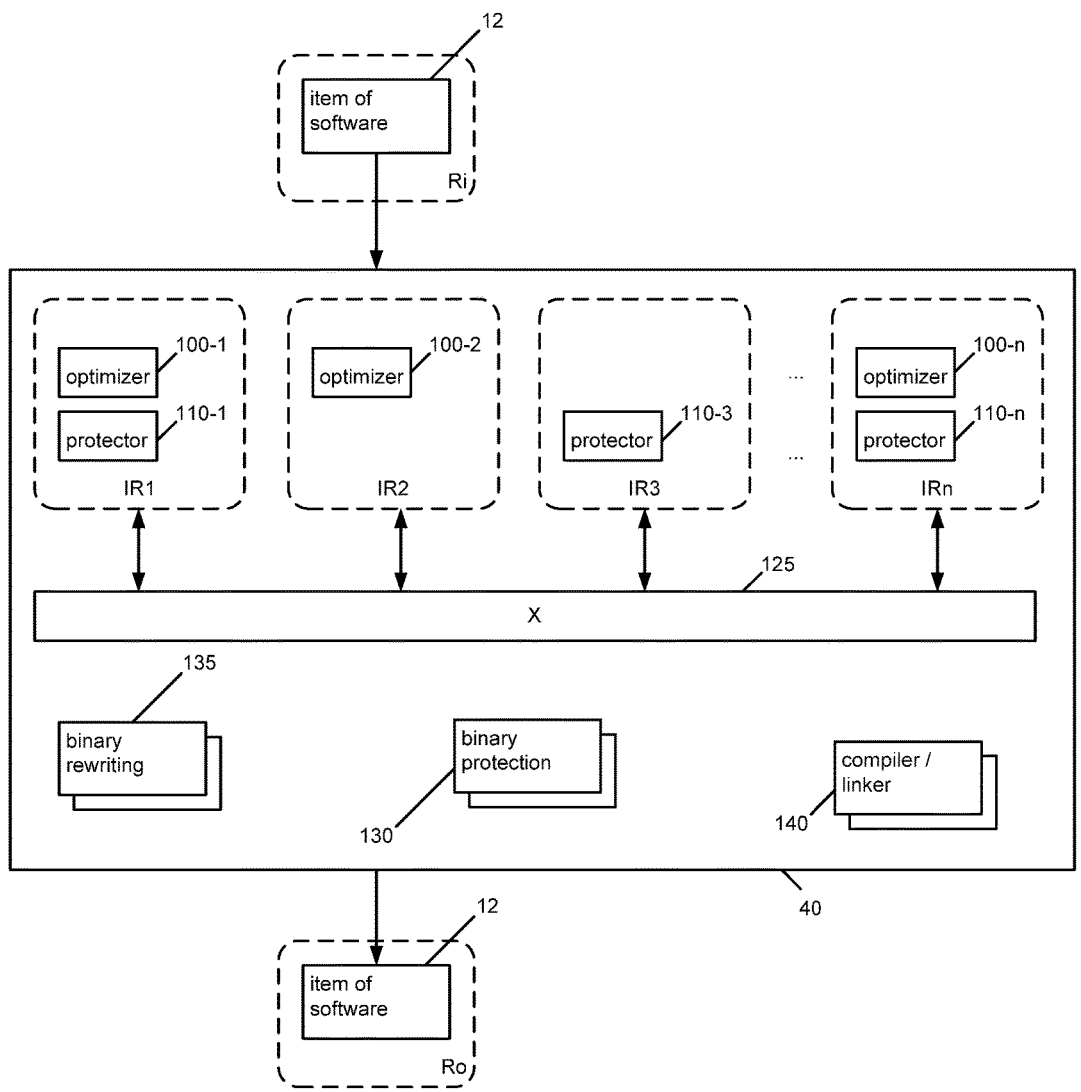
FIG. 10 shows how the arrangement of FIG. 2 can be expanded to use a larger number of intermediate representations, and to apply optimization and/or protection in different ones of these intermediate representations.

FIG. 10 is similar to FIG. 2, but shows how an arbitrary number of intermediate representations IR1 . . . IRN may be used by the optimization and protection toolset 40, with each intermediate representation being used for one or both of protection and optimization. For example, in the arrangement of FIG. 10 the first intermediate representation IR1 is used by both an optimizer component 100-1 and a protector component 110-1, the second intermediate representation is used by an optimizer component 100-2, but not by any protector component, and the third intermediate representation is used by a protector component 110-3 but not by any optimizer component. As for FIG. 2, each optimizer component may comprise one or more optimizer subcomponents (not shown in FIG. 10) and each protector component may comprise one or more protector subcomponents (also not shown in FIG. 10). These subcomponents may carry out any of the functions of optimization and protection as already discussed above, but within the confines of the appropriate intermediate representation.

Note that although FIG. 10 shows different protector and/or optimizer components for use with each different intermediate representation, it is also possible for one or more of the protector and/or optimizer components to work within multiple different ones of the intermediate representations. Although the components shown in FIG. 10 in respect of each intermediate representation are optimizer and/or protector components, components for carrying out other tasks and transformations on the item of software may be provided, for use in one or more of the intermediate representations.

The various intermediate representations IR1 . . . IRN may include LLVM IR, and various other representations for example as already discussed above. In order to convert the item of software, typically in various states of protection and/or optimization as the toolset is used, between the various intermediate representations IR1 . . . IRN, appropriate converter functionality 125 is provided. Converter functionality 125 may be implemented for example as a single library, class, tool or other element, or as multiple such elements with each such element carrying out one or more of the required conversion types. It is not always necessary for all possible conversions between the various intermediate representations to be provided, and similarly some conversions may be provided as combinations of two or more other conversions, for example through a more commonly used intermediate representation such as LLVM IR.

Also shown in FIG. 10 as part of the optimization and protection toolset 40 are one or more binary rewriting tools 135, one or more binary protection tools 130, and one or more compiler and/or linker tools 140. Each of these may operate using one or more of the intermediate representations IR1 . . . IRN, or other representations, according to the requirements of the toolset 40.

Figure 11:
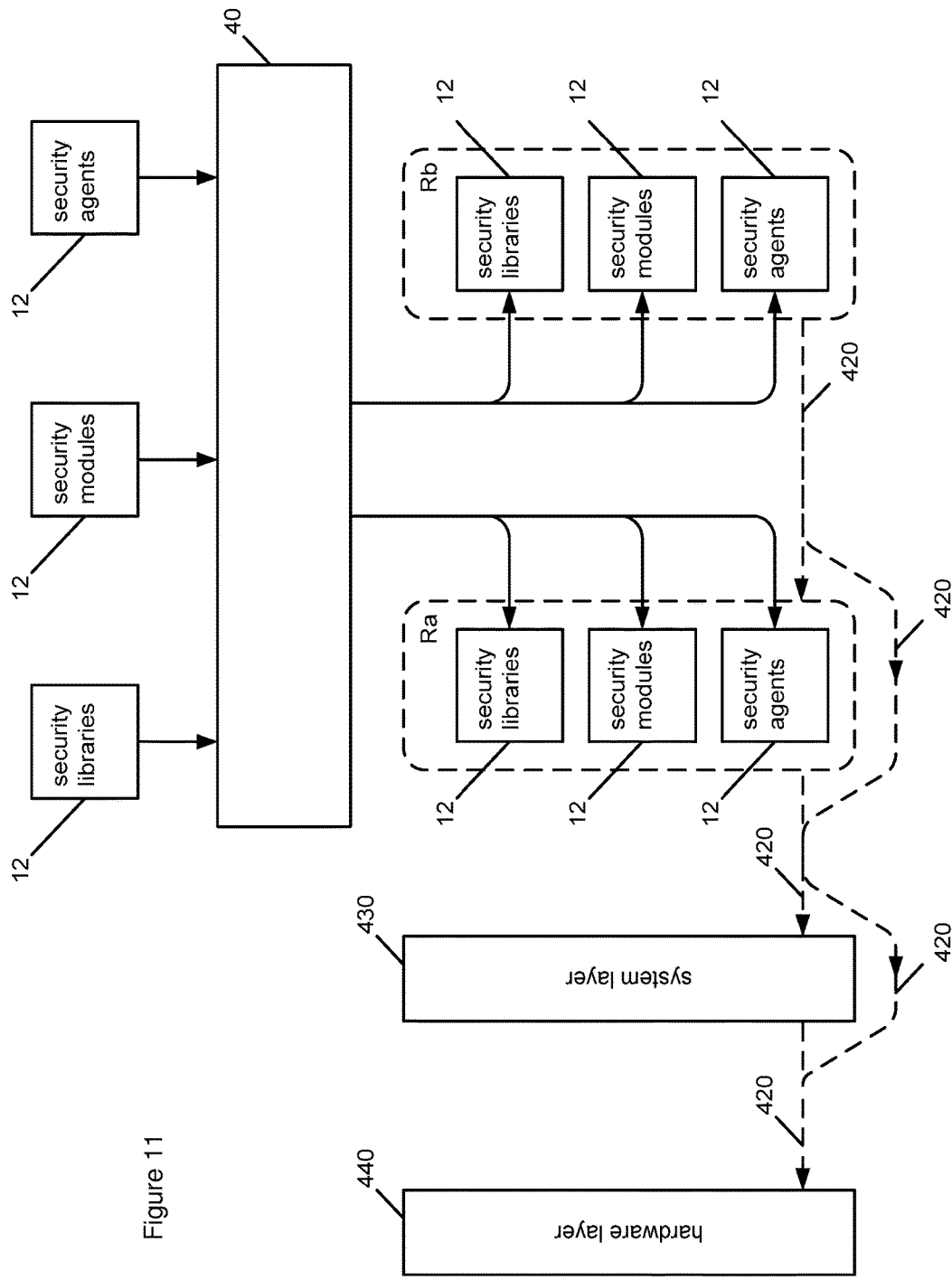
FIG. 11 illustrates the processing of software items such as security libraries, modules and agents by the optimization and protection toolset.

The optimization and protection toolset 40 discussed above and illustrated in FIGS. 2, 9 and 10 can be used to protect software components such as libraries, modules and agents, as well as applications, and all such software components fall within the scope of the described items of software 12. This is illustrated in FIG. 11 in which various items of software 12 which may be security libraries, modules, agents and similar are input to the optimization and protection toolset 40, which outputs these items of software 12 in protected and optimized forms. Any such item of software 12 may be output in a native/binary code representation Rb and/or an asm.js representation Ra according to requirements. The arrows 420 connecting one or more of the optimized and protected items of software 12 in the asm.js representation with one or more of the optimized and protected items of software 12 in the native/binary code representation, and each of these with an underlying system layer 430 and a further underlying hardware layer 440, represent that each of the asm.js, native and system layers can access and use features such as security features of each lower level in the hierarchy.

In general, software components such as security libraries, modules and agents have their own security capabilities and features, and robustness and security of these software components may be critical in ensuring the security of applications within which they are used or by which they are referenced or called. The optimization and protection toolset 40 and work flows described herein can therefore be used to improve the security of such software components, and therefore also applications within which such components are used.

Using aspects of the invention, a user device 20 can be provided with multiple layers of security including hardware level security features, system or operating system level security features, native layer security features and web layer security features. Software components such as libraries, modules and agents protected using the optimization and protection toolset 40 can provide access to hardware and system level security features which should not be made visible to the web application layer. Since the optimization and protection toolset 40 can be used to create protected software components in both native code and JavaScript (including asm.js), it can be used to construct and support invoking dependencies from protected software components in JavaScript/asm.js to protected software components in native code.

Example Protection Technique

Described below is one example method/technique for applying protection to an item of software (although it will, as discussed above, be appreciated that many different protection techniques are available and could be used with embodiments of the invention). This method shall be referred to herein as the "structure protection method". In some embodiments of the invention, the structure protection method is implemented/applied by the protection component 110 (or one of its subcomponents 112) of the toolset 40 described above. However, it will be appreciated that some embodiments of the invention do not make use of the toolset 40 and, therefore, the structure protection method may be implemented/applied by a different software protection system (executed by one or more processors of one or more data processing apparatus).

Figure 12:
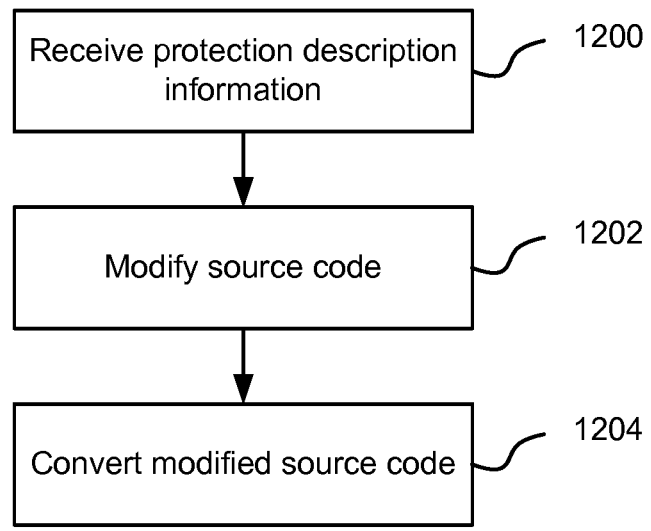
FIG. 12 is a flowchart schematically illustrating the structure protection method according to an embodiment of the invention FIG. 13 schematically illustrates an example trie.

FIG. 12 is a flowchart schematically illustrating the structure protection method according to an embodiment of the invention.

The structure protection method operates on source code (i.e. the item of software which the structure protection method modifies in order to apply protection is in source code format)—of course, as described above, an initial item of software that is not in source code format may be converted into source code format in order to apply the structure protection method. The structure protection method is particularly envisaged as operating on JavaScript code, but it will be appreciated that this protection method may be implemented so as to operate on software written in other languages, such as C/C++ source code, Visual Basic source code, Java source code, etc. Thus, in general, the structure protection method involves receiving an input item of source code, applying a protection technique (to be described below) to that input item of source code, and outputting a protected item of source code.

More particularly the structure protection method is targeted at protecting structured data items in the source code, where the structured data items have independently modifiable components or fields. Examples of such structured data items are objects or classes or structures etc. (whose independently modifiable components are called properties or elements) and arrays and lists (whose independently modifiable components are the indexed elements of the array or list). In the following, any such structured data item shall be referred to simply as a "structure" (although this will, of course, not be taken to mean that embodiments are limited to just protecting structures such as a C/C++ struct) and the independently modifiable components (or fields or elements or properties) of the structure shall be referred to simply as "elements" of the structure. An element of a structure may be another structure.

As will become apparent, a structure is protected by modifying how the structure is represented (in terms of its format/layout). The representation of the actual elements themselves (as now stored within the modified structure) may also be modified. That is, the information in the structure is preserved, but its form/layout and representation are modified to make its analysis more challenging to an attacker.

Note that a structure may be used in multiple different ways—for example, a structure that is an array with two elements could be used to (a) represent the x- and y-coordinates of a point on a display or (b) represent upper and lower bounds for a range for a variable/setting. It may therefore be desirable to be able to apply different protections (or levels and/or types of protection) to the same structure where it is being used in the item of software in different ways. Similarly, a structure when being used for the same purpose may require different protections (or levels and/or types of protection) depending on the location within the item of software or source code at which the structure is located and is to be processed.

The structure protection method shall be described below with reference to the following example structure (although it will, of course, be appreciated that the structure protection method is applicable to other types of structure and that embodiments of the invention are not limited by this specific example structure). This example structure (shown in pseudo-code below) represents a record for data about an employee of a company:

```
EmployeeRecord = {
    empName;        /* name of employee */
    empID;          /* employee identifier */
    hourlyRate;     /* hourly rate of pay */
    regHours;       /* regular work hours by week */
    ovtmHours;      /* overtime hours by week */
    managerID;      /* empID for this employee's manager */
    directReports;  /* managee empIDs (<= 40) */
    yearsAtCo;      /* no. years with company */
};
```

A user of the protection system may identify one or more structures within the source code that are to be protected. This may include, for example, identifying EmployeeRecord as a structure to be protected (as instances of EmployeeRecord might contain data that is attractive to an attacker for attempted unauthorized access or modification). This may involve, for example, the user inspecting the source code and determining/spotting one or more such structures, or the user being informed that any structure which relates to, or which represents or contains, certain data needs to be protected, etc.

Having identified one or more structures within the source code that are to be protected, the user of the protection system generates protection description information. This may be performed manually or may be performed, in whole or in part, in an automated manner once the one or more structures to be protected have been identified. In the following, the protection description information shall be represented by two files or objects, called KeyTemplates and DataTemplates (which may be provided, for example, in JSON form), but it will be appreciated that other ways of providing the same information may be used, so that embodiments of the invention are not limited to using such KeyTemplates and DataTemplates objects/files and nor are embodiments of the invention limited to the specific formats of the KeyTemplates and DataTemplates objects/files discussed below.

In summary, DataTemplates specifies the initial/actual structure/format of the (unprotected) structure(s) to be protected and, potentially, also what type and/or what level of protection to apply to one or more elements of those structure(s), whilst KeyTemplates specifies what type and/or what level of protection to apply for protecting the structure/format/layout of those structure(s) defined in DataTemplates. Thus, the protection description information specifies, or comprises data identifying/indicating: (a) the initial/actual structure/format of the (unprotected) structure(s) to be protected; (b) potentially what type and/or what level of protection to apply for protecting the structure/format/layout of those structure(s); and (c) potentially, also what type and/or what level of protection to apply to one or more elements of those structure(s).

In some embodiments, the protection description information may already be available to the user (it might have been generated previously, or might be provided by a third party, etc.), so the user does not need to go through the above steps of identifying structures and generating the protection description information—instead, the user may just provide the protection description information to the protection system/component that is implementing the structure protection method.

Therefore, in general, at a step 1200, the system/component that is implementing the structure protection method receives protection description information.

Turning, first to the KeyTemplates object/file (or specification). Two instances of a structure are similarly disguised/protected if they have the same "key". Here, a "key" may specify a family or type of protection or obfuscation (which may be represented by a string suitable as an identifier in the source code language, such as a JavaScript identifier). Additionally or alternatively, the key may also specify a level of protection. For example, the key may be specified as by the string 'boundaryProtection5' which indicates that the name of the protection family is 'boundaryProtection' and the level of protection is level 5. In other words, a key may identify or specify or indicate (a) a type of protection or obfuscation technique or kind of encoding (in the above example, the type is called 'boundaryProtection') and/or (b) a level or degree of protection based on that particular protection or obfuscation technique or kind of encoding (in the above example, the level of protection is level 5). For example, level 1 of a given type of encoding might provide linear finite-ring encodings for characters in strings, whereas level 10 might use third degree polynomial encodings for characters in strings, which is slower to manipulate but harder for an attacker to analyse. The skilled person will appreciate that there are numerous different types of protection for protecting quantities of data and that those types of protection may be implemented with various degrees of strength or complexity—hence, such protection types and protection levels shall not be described in more detail herein. It will be appreciated that, for some embodiments, a protection type may have only one "level", in which case a key may specify only the type of protection and not a level. Similarly, some embodiments may only use one type of protection for which multiple levels may be available, in which case a key may specify only the level of protection and not a type. In the following, a key shall be represented as a string of the form "<protection type><protection level>" (such as 'boundaryProtection5'), but it will be appreciated that other ways of representing a key are possible.

The KeyTemplates object/file has one or more fields (or entries/properties). In the KeyTemplates object/file, each field has either:

(a) a value which is a key as set out above or (b) a value with two components (e.g. an array of two elements), one of which identifies another field/entry/property in the KeyTemplates object/file, and the other of which is a key as set out above.

As an example, the KeyTemplates object/file may be of the form

```
KeyTemplates = {
    EmployeeRecord = 'HRPriv10';
    EmployeeRecordHigh = ['EmployeeRecord', 'HRPriv15'];
    EmployeeRecordLow = ['EmployeeRecord', 'Basic3'];
};
```

Thus, with this specific the KeyTemplates object/file:

there is a field of the KeyTemplates object/file called EmployeeRecord, which indicates that an instance of an EmployeeRecord structure may have the HRPriv type of protection or obfuscation or encoding applied to it at level 10;

there is a field of the KeyTemplates object/file called EmployeeRecordHigh, which indicates that an instance of an EmployeeRecord structure may have the HRPriv type of protection or obfuscation or encoding applied to but at level 15;

there is a field of the KeyTemplates object/file called EmployeeRecordLow, which indicates that an instance of an EmployeeRecord structure may have the Basic type of protection or obfuscation or encoding applied to it at level 3.

Turning next to the DataTemplates object/file (or specification), as mentioned, the purpose of the DataTemplates object/file is to specify the actual/initial (unprotected) structure or format/layout for the structure(s) to be protected. These structure(s) to be protected correspond to the structures for which keys (i.e. protection types and/or levels of protection) are specified in the KeyTemplates specification. The DataTemplates object/file may also specify, for one or more of the elements of a structure to be protected, a key for that element in order to specify or identify a type and/or a level of protection to be applied to that element.

The DataTemplates object/file has one or more fields (or entries/properties). Since the DataTemplates object/file specifies structure/layout/format, there is a field in the DataTemplates object/file that corresponds to each KeyTemplates field that is of type (a) as set out above, i.e. a value which is a key. For example, for each KeyTemplates field that is of type (a) as set out above, there may be a corresponding field in the DataTemplates object/file that has the same name as that KeyTemplates field. Note that if the KeyTemplates file/object has a field of type (b) as set out above (i.e. a value with two components, one of which identifies another field/entry in the KeyTemplates object/file, the other of which is a key), then there need not be a corresponding field in the DataTemplates object/file because the structure which such a field would have specified has already been specified for another field in the KeyTemplates object/file. This allows a given structure to have multiple entries in the KeyTemplates object/file so that different protection levels and schemes can be associated with that structure, depending on the context in which that structure is used. This also provides for efficient storage/reference and efficient updating/maintenance of the DataTemplates and KeyTemplates objects/files.

Continuing with the example above, therefore, in which:

```
KeyTemplates = {
    EmployeeRecord = 'HRPriv10';
    EmployeeRecordHigh = ['EmployeeRecord', 'HRPriv15'];
    EmployeeRecordLow = ['EmployeeRecord', 'Basic3'];
};
``` the DataTemplates object/file could also have a field named EmployeeRecord, which may be as follows:

```
DataTemplates = {
    EmployeeRecord = {
        empName = 'CHRPriv10'; /* name of employee */
        empID = 'CHRPriv10'; /* employee identifier */
        hourlyRate = 'NHRPriv10'; /* hourly rate of pay */
        regHours = ['NHRPriv5',0,52]; /* regular work hours by week */
        ovtmHours = ['NHRPriv5',0,52]; /* overtime hours by week */
        managerID = 'CBasic3'; /* empID for this employee's manager */
        directReports = ['CBasic3',0,40];  /* managee empIDs (<= 40) */
        yearsAtCo = 'KHRPriv10'; /* no. years with company */
    }
};
```

In particular, the value of each field in the DataTemplates object/file is a template, where a template for the structure to be defined/specified itself has one or more fields to specify the elements of (i.e. the layout/format of) the structure (and possibly, for one or more of these elements, a key for that element in order to specify or identify a type and/or a level of protection to be applied to that element). In the above example, the layout/format of the EmployeeRecord structure is defined. Additionally:

The elements empName, empID and managerID of the EmployeeRecord structure are described in the DataTemplates object/file with string values that begin with 'C'. This indicates that the elements empName, empID and managerID of the EmployeeRecord structure are strings. The elements empName and empID also have an indication of a corresponding key, namely HRPriv10. The element managerID has an indication of a different corresponding key, namely Basic3.

The element hourlyRate of the EmployeeRecord structure is described in the DataTemplates object/file with a string value that begins with 'N'. This indicates that the element hourlyRate of the EmployeeRecord structure is a number. The element hourlyRate also has an indication of a corresponding key, namely HRPriv10. An element of a structure that is a number (as identified in the DataTemplates object/file with a string value that begins with 'N') may, when the protections are applied, be converted to a string which may then be encoded in the same manner as for an element of a structure that is a string (as identified in the DataTemplates object/file with a string value that begins with 'C').

The element yearsAtCo of the EmployeeRecord structure is described in the DataTemplates object/file with a string value that begins with 'K'. This indicates that the element yearsAtCo of the EmployeeRecord structure is an integer number (e.g. one fitting in 32 bits in 2's complement form). The element yearsAtCo also has an indication of a corresponding key, namely HRPriv10. An element of a structure that is an integer number (as identified in the DataTemplates object/file with a string value that begins with 'K') may, when the protections are applied, be encoded using a lossless homomorphic encoding specified by the key for that element.

The elements regHours, ovtmHours and directReports of the EmployeeRecord structure are described in the DataTemplates object/file with a string value of the form [template, lowerSizeLimit, upperSizeLimit] denoting an array of elements where each element of the array is described by template, in which the size of the array lies between lowerSizeLimit and upperSizeLimit elements, where lowerSizeLimit and upperSizeLimit are integer numbers. If lowerSizeLimit is 0, this indicates that the array may be empty; if upperSizeLimit is 0, this indicates that the array may be arbitrarily large. Thus, for example, both regHours and ovtmHours are described in the DataTemplates object/file with a string value ['NHRPriv5',0,52], which indicates that they are (possibly empty) arrays of up to 52 elements, and each element of those arrays are of the 'NHRPriv5' type which, as described above, indicates that they are numbers and each number is to be protected with a type of protection of HRPriv at a level of protection of level 5. Similarly, directReports is described in the DataTemplates object/file with a string value ['CBasic3',0,40] which indicates that it is a (possibly empty) array of up to 40 elements, and each element of that array is of the 'CBasic3' type which, as described above, indicates that they are strings and each string is to be protected with a type of protection of Basic at a level of protection of level 3.

Other ways of specifying, in DataTemplates, the type of an element of a structure to be protected may be used, and it will be appreciated that other types of element can be used (depending, of course, on the source code language under consideration).

As mentioned above, embodiments of the invention may make use of other ways to specify the initial/unprotected form (or format/layout/structure, or the particular elements) of each structure to be protected as well as the levels and/or types of protection to be applied to the structures and elements to be protected.

We turn next to how the format/layout of a structure is modified, or, more accurately, how an unprotected structure is represented in a different format/layout in accordance with the structure protection method.

Data structures, known as tries, are well-known—see, for example, http://en.wikipedia.org/wiki/Trie. A trie is a data structure used for rapidly accessing a set of records based on keys (here, the term "key" is different from the "keys" mentioned above) or indices which can be naturally divided into parts (such as numbers or words). The trie is representable a tree of nodes, in which the root node contains no content, and each node's descendants contain or represent "choices" (i.e. a choice to move from the parent node to a child node of that parent node in accordance with a key). A node may also indicate whether it is final (i.e. a leaf node), in which case it indicates (identifies or represents or stores) a corresponding record selected by that key/index, or that it is not final, in which case it has one or more child nodes representing further choices.

Figure 13:
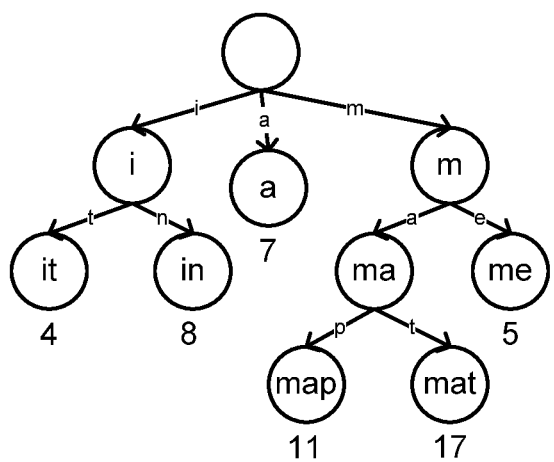

FIG. 13 schematically illustrates an example trie. In this trie, the keys/indices are words (in this case the words: a, it, in, map, mat, me). The links (arrows) are labelled with the choice (in this case, letters) which selects an alternative. The nodes (circles) are labelled with the accumulated portion of the key/index indicated by the choices made so far starting from the root node. The numbers are the records/data stored by the trie (or could be addresses for separately stored data or indexes into a separately stored array of records holding the data). Thus the mappings represented by this trie are: a→7, it→4, in→8, map→11, mat→17, me→5.

Certain (optional) optimizations are available for representing a trie:

The current labelling in the nodes can be removed, since all of the information it provides is already provided by the labels on the arrows.

The labels on the arrows can then be moved into the (now unoccupied) nodes. Arrows do not really need labelling separately from the labels on the nodes to which the arrows point.

These changes make the representation of the nodes and arrows more compact while having no effect on the lookups which can be performed using the trie.

The format/layout of a structure to be protected can be represented as a trie. In particular, the root node of the trie can represent the structure per se whilst other nodes of the trie can represent respective element(s) of the structure (i.e. the non-root nodes can be, or can represent, a respective property, field, element, array-index, etc.).

Having represented the structure to be protected as a trie, then the structure protection method may protect the structure by adjusting/modifying that trie. In particular, the nodes of the trie may be relabelled (so that an inspection of the trie by an attacker does not reveal any semantics of what a node represents). Moreover, the trie may be modified/adjusted to include further nodes. For example, one or more path(s) of nodes within the trie may have one or more further nodes (and potentially branches therefrom) included so that the number of links from the root node to the leaf node representing an element of the structure may be increased. Additionally or alternatively, the nature of a node may be adjusted (for example, instead of a node representing a property of a structure, the node may be changed to represent an array-index). For example, a structure may have an element called "price", so that the trie then has a path of one or more node(s) for selecting the element price—the structure protection method may then involve adjusting the trie so that, to select the element price, the node path involves the root node, followed by selecting a node representing a property called Q790A (which may correspond to an array), then selecting a node representing an element from the array with index 7 (which may correspond to a structure), then selecting a node representing property of that structure called fT9_x40k.

Therefore, for a structure to be protected, a protected/obfuscated trie may be generated (it being appreciated that it is not necessary to actually generate a trie that represents the unprotected structure and then modify that trie—i.e. a "protected" trie may be generated directly based on the protection description information). In particular, given a root node, then for each element of the structure to be protected, the structure protection method may randomly choose steps or nodes to insert into the trie (which may form one path within the trie or which may include one or more branches/paths within the trie). The minimum number of nodes to insert (as randomly chosen) is one, since one access step in the original unprotected structure cannot be less than one access step in the obfuscated trie. The random choice of the number of nodes may be based, at least in part, on the level of protection indicated in the key for the structure as defined/specified in the KeyTemplates object/file—so that the higher the level of protection, the more likely the randomly selected number will be higher so as to include more steps/nodes and therefore make the obfuscation/protection more difficult for an attacker to analyse—i.e. the random number may be biased based on the level of protection. Similarly, the property-names and array-indices may be chosen randomly. In some embodiments, the number of distinct array-indices should not greatly exceed the number of choices to be made for efficiency reasons (e.g. if there are N distinct elements to choose, then more no more than pN distinct indices are specified for the obfuscated trie where p is a predetermined value, for example, p=2).

In some embodiments, for each element of the structure to be protected, an access path for a given node is chosen within the trie independently of the other elements of the structure (i.e. nodes/steps are added to the trie independently of nodes/steps already existing in the trie). However, this may lead to a large size of the trie in comparison to the size of the unprotected structure, which may be undesirable. Therefore, in some embodiments, the random selection of intermediate steps/nodes in the trie favours steps/nodes already chosen for neighbouring elements which have the same parent node in the labelled (unprotected) trie. For example, if (using the example above), for an structure x with an element "price" we expand a property access x.price into y.Q790A[7].ft9_x40k, where x denotes the original structure and y the obfuscated structure, then for another element "product" of the structure x, the structure protection method will tend to choose a partially shared obfuscation for x.product code such as y.Q790A[7].gw10WHn, or, with less sharing, perhaps y.Q790A[3][8]. The amount of "sharing" of nodes, and the decision on whether or not to share, may be randomly chosen, again with the random decision being based/biased on the level of protection (e.g. with a higher level of protection for the structure, there may be less sharing, and with a lower level of protection for the structure, there may be more sharing).

The way in which nodes/steps are included in the trie may be varied—for example, some methods may not include indices for arrays (such as the [3], [7] and [8] used above), some methods may prefer to use a flatter but wider form for the trie, whereas others may prefer to use a deeper form for the trie, etc. These options may correspond to the type of protection indicated in the key for the structure as defined/specified in the KeyTemplates object/file.

To enable obfuscated structures to be generated and used within the source code, various functions (or procedures or routines) may be provided or made available. The structure protection method may, therefore, at a step 1202, comprise including one or more of these functions within the source code, i.e. modifying the source code so as to use one or more of these functions, based on the received protection description information. Examples of these functions are set out below, although it will be appreciated that other functions could be provided, that not all of these functions need to be provided, and that other formulations/representation of these functions could be used instead. Then, at a step 1204, the functions may be converted into obfuscated code (based on the protection description information), as shall be described below. Example functions include:

A function (herein called templateEncode) to create an obfuscated/protected structure from an unprotected structure, for example:

obfStruct=templateEncode (struct,templateName,tag)

Here, struct identifies a program variable (in the source code) for an instance of the unprotected structure that is to be protected; obfStruct identifies a program variable (in source code) for an instance of the protected structure generated by the function templateEncode; templateName identifies or indicates an entry in the KeyTemplates object/file (to thereby identify/specify a type of encoding/protection and/or a level of encoding/protection to be applied to the struct instance to obtain the obfStruct instance); and tag is a value used to seed the random selections used for generating the obfuscated structure and for performing protection on the individual elements of the obfuscated structure.

Thus, for example, if x is a variable in the source code for an unprotected instance of the EmployeeRecord structure, then a corresponding protected/obfuscated version could generated, and represented by the variable y in the source code, by including the following line of code in the item of software:

y=templateEncode(x, 'EmployeeRecord',t1);

If a higher level of protection were desired, then the following line of code could be included instead:

y=templateEncode(x, 'EmployeeRecordHigh',t1);

The templateEncode function would generate an obfuscated/encoded structure instance using the trie method described above.

The templateEncode function would not need conversion at the step 1204.

A function (herein called templateDecode) to create an unprotected structure from an obfuscated/protected structure, for example:

struct=templateDecode(obfStruct,templateName,tag)

Here, obfStruct identifies a program variable (in the source code) for the instance of the protected structure that is to be unprotected/decoded; struct identifies a program variable (in the source code) for the instance of the unprotected structure generated by the function templateDecode; templateName identifies or indicates an entry in the KeyTemplates object/file (to thereby identify/specify a type of encoding/protection and/or a level of encoding/protection that was applied when the protected obfStruct structure was initially generated); and tag is the value that was used to seed the random selections to generate the obfuscated structure and that was used for performing protection on the individual elements of the obfuscated structure.

Thus, for example, if y is the variable in the source code generated above for a protected/obfuscated instance of the EmployeeRecord structure via the function call y=templateEncode(x, 'EmployeeRecord',t1);

then the corresponding unprotected structure x could (re)generated via by including the following line of code in the item of software:

x=templateDecode(y, 'EmployeeRecord',t1);

The templateDecode function would not need conversion at the step 1204.

A function (herein called templateAccess) to access an element of a protected structure, for example:

z=templateAccess(obfStruct,templateName,tag,'path'[, optIndexArry])

Here, obfStruct identifies a program variable (in the source code) for the instance of the protected structure that is to accessed; templateName identifies or indicates an entry in the KeyTemplates object/file (to thereby identify/specify a type of encoding/protection and/or a level of encoding/protection that was applied when the protected obfStruct structure was initially generated); and tag is the value that was used to seed the random selections to generate the obfuscated structure and that was used for performing protection on the individual elements of the obfuscated structure. Access is provided to the element specified by the plain string path, converting the steps in that path into the more complex steps selected by the encoding type and level of protection specified for the templateName entry in KeyTemplates under the specific random choices selected for the given tag.

For example, if access to the yearsAtCo element of a protected EmployeeRecord structure y is desired, then the following line of code can be included in the item of software:

z=templateAccess(y, 'EmployeeRecord',t1,'.yearsAtCo')

The returned element z may be in encoded form (if protection has been applied to the value of the element in the protected structure);

alternatively, the function templateAccess may undo the protection applied to that element and thereby return the unprotected value of the element being accessed.

A description of optIndexArray is given shortly.

The templateAccess function would need conversion at the step 1204. For example, the original source code may have initially had the following code: z=x.price. The instance x may have been converted into a protected structure instance y as described above via a call to the function templateEncode, so that the data for the element price is accessible as y.Q790A[7].ft9_x40k. At the step 1202, the code z=x.price would be replaced with a call to the function templateAccess, e.g. z=templateAccess(y,templateName,tag,'.price'). This would then be replaced at the step 1204, based on the protection description information, with the code z=y.Q790A[7].ft9_x40k, where, as described above, the nodes/steps in the trie (Q790A, [7] and ft9_x40k) were inserted and named randomly by the call to the templateEncode function based on the type and/or level of protection specified by the key corresponding to templateName and based on the seed specified by tag.

A function (herein called templateUpdate) to update/set the value of an element of a protected structure, for example:

templateUpdate (obfStruct,templateName,tag,'path'[, optIndexArray],exp)

Here, obfStruct identifies a program variable (in source code) for the instance of the protected structure that is to accessed/updated; templateName identifies or indicates an entry in the KeyTemplates object/file (to thereby identify/specify a type of encoding/protection and/or a level of encoding/protection that was applied when the protected obfStruct structure was initially generated); and tag is the value that was used to seed the random selections to generate the obfuscated structure and that was used for performing protection on the individual elements of the obfuscated structure. Access is provided to the element specified by the plain string path, converting the steps in that path into the more complex steps selected by the encoding type and level of protection specified for the templateName entry in KeyTemplates under the specific random choices selected for the given tag—that element is to be updated by assigning exp to that element.

For example, if an update of the yearsAtCo element of a protected EmployeeRecord structure y is desired (to set its value to 13, say), then the following line of code can be included in the item of software:

templateUpdate(y, 'EmployeeRecord',t1,'.yearsAtCo', 13)

When an obfuscated element is overwritten, it must be overwritten with an element having the same obfuscation, which means that corresponding manipulations of the value exp are performed based on the corresponding key specified by DataTemplates before storing the obfuscated value exp in the obfuscated trie.

A description of optIndexArray is given below.

The templateUpdate function would need conversion at the step 1204. For example, the original source code may have initially had the following code: x.price=z. The instance x may have been converted into a protected structure instance y as described above via a call to the function templateEncode, so that the data for the element price is accessible as y.Q790A[7].ft9_x40k. At the step 1202, the code x.price=z would be replaced with a call to the function templateUpdate, e.g. templateUpdate (y,templateName,tag,'.price',z). This would then be replaced at the step 1204, based on the protection description information, with the code y.Q790A[7].ft9_x40k=z (here, for simplicity, the value being stored is not a protected value, so that the actual value z is stored in the protected structure y).

The purpose of the optional optIndexArray is to provide indexes computed at run-time. For example, a path such as 'x[3][15]' needs no optIndexArray, because the literal constant indexes 3 and 15 are provided in the path. However, if the index needs to be computed at run-time, this no longer works. If the source code has a path such as 'x[i][j]' where the values of i and j are not known when path is written in the source code, then a mechanism to pass the index values is needed. Such symbolic indexes are ignored by the manipulation routines above, but the function then expects an array argument to follow the 'path'. For example, the array argument optIndexArray might contain [7*a+k,−2*b] which would make the value of i and j whatever 7*a+k and −2*b, respectively, evaluate to when the function call is made. In this example, the elements of the array are filled in for the symbolic indexes in the path from left to right.

As an example, therefore, suppose that x is an unprotected instance of the EmployeeRecord structure. It could be protected, to form a protected instance y, by including the following line of code in the source code:

y=templateEncode(x, 'EmployeeRecordHigh',1352);

Here, the high level of protection (as specified by the EmployeeRecordHigh field in KeyTemplates), is being used, with a tag/seed value of 1352.

Figure 14:
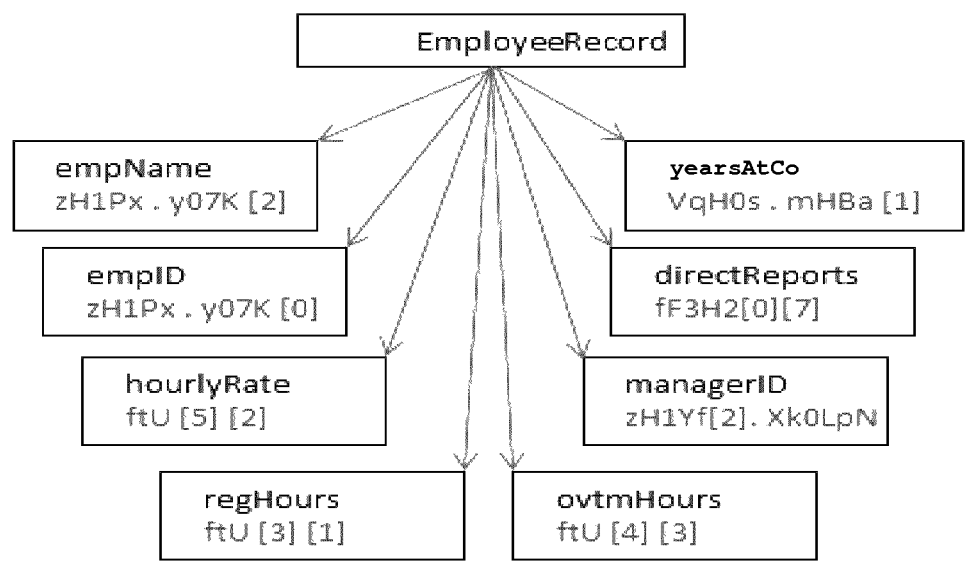
FIG. 14 schematically illustrates a protected structure in the form of a trie.

The outcome (namely the protected structure y) may be, for example, represented by the trie shown in FIG. 14.

The element yearsAtCo could be accessed by including the following line of code in the source code at the step 1202:

N=templateAccess(y, 'EmployeeRecordHigh',1352,'.yearsWithCo');

The step 1204 would convert this to something quite different, such as:

N=((y.VqH0s.mHBa[1]*vs0198 & 0xFFFFFFFF)+vs9410) & 0xFFFFFFFF;

Here, y.VqH0s.mHBa[1] accesses the protected value for the element yearsAtCo (as shown in FIG. 14). The protection that has been applied to the actual value of the element yearsAtCo is undone by use of the constants vs0198 and vs9410 (which, in this example, are constants generated for an encoding of a value using a linear mapping over the finite ring of integers modulo 232).

The element yearsAtCo could be updated to the value w by including the following line of code in the source code at the step 1202:

N=templateUpdate(y, 'EmployeeRecordHigh',1352,'.yearsWithCo',w);

The step 1204 would convert this to something quite different, such as:

y.VqH0s.mHBa[1]=((w*vs4352 & 0xFFFFFFFF)+vs3427) & 0xFFFFFFFF;

Here, y.VqH0s.mHBa[1] accesses the protected value for the element yearsAtCo (as shown in FIG. 14). The protection that has been applied to the actual value of the element yearsAtCo is applied to the value w by use of the constants vs4352 and vs93427 (which, in this example, are constants generated for encoding a value using a linear mapping over the finite ring of integers modulo 232). The constants vs4352 and vs93427 are related to the constants vs0198 and vs9410 as is known in this field of technology (so that the constants vs4352 and vs93427 are used for protecting a value and the constants vs0198 and vs9410 are used for unprotected that protected value).

Although particular embodiments have been described, the skilled person will be aware of modifications and alterations to these which remain within the spirit and scope of the invention.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method comprising:
    carrying out, in a first type of intermediate representation, optimization of an item of software represented in the first type of intermediate representation, wherein the optimization comprises optimization for one or more of size, runtime speed, runtime memory requirement, and usage of core and GPU processors, of the item of software;
    carrying out, in a second type of intermediate representation, protection of the item of software represented in the second type of intermediate representation by applying one or more protection techniques to the item of software, wherein the second type of intermediate representation is different from the first type of intermediate representation and the one or more protection techniques comprise one or more of white box protection techniques, node locking techniques, data flow obfuscation, control flow obfuscation and transformation, homomorphic data transformation, key hiding, program interlocking and boundary blending; and
    outputting the item of software, after carrying out the optimization and the protection, in either (i) a source code representation or (ii) a script representation suitable for use by a web browser;
    wherein the method comprises one or both of: (a) converting the item of software from being represented in the first type of intermediate representation to being represented in the second type of intermediate representation after carrying out optimization and before subsequently carrying out protection; and (b) converting the item of software from being represented in the second type of intermediate representation to being represented in the first type of intermediate representation after carrying out protection and before subsequently carrying out optimization.

2. The method of claim 1 wherein carrying out optimization comprises carrying out optimization in the first type of intermediate representation both before and after carrying out protection in the second type of intermediate representation.

3. The method of claim 1 wherein carrying out protection comprises carrying out protection in the second type of intermediate representation both before and after carrying out optimization in the first type of intermediate representation.

4. The method of claim 1 wherein the first type of intermediate representation is LLVM intermediate representation, LLVM IR.

5. The method of claim 1 wherein the protection is performed by a cloaking engine.

6. The method of claim 1 further comprising providing the item of software in an input type of representation, and converting the item of software in the input type of representation to the first type of intermediate representation before carrying out optimization and protection.

7. The method of claim 6 wherein converting the item of software in the input type of representation to the first type of intermediate type of representation before carrying out optimization and protection comprises converting the item of software from the input type of representation to the second type of intermediate representation then converting the item of software from the second type of intermediate representation to the first type of intermediate representation.

8. The method of claim 6 wherein the input type of representation is a source code representation.

9. The method of claim 7 wherein the source code representation is one of C, C++, Objective-C, Java, JavaScript, C#, Ada, Fortran, ActionScript, GLSL, Haskell, Julia, Python, Ruby and Rust.

10. The method of claim 6 wherein the input type of representation is a binary code representation.

11. The method of claim 1 wherein said outputting comprises converting the item of software to an output type of representation after carrying out the optimization and protection.

12. The method of claim 1 further comprising applying binary protection to the output item of software after the compiling and linking the output item of software.

13. The method of claim 11 wherein converting the software item to an output type of representation comprises converting the item of software from the first type of intermediate representation to the second type of intermediate representation, then converting from the second type of intermediate representation to a source code representation.

14. The method of claim 11 wherein the output type of representation is a JavaScript representation.

15. The method of claim 11 wherein the output type of representation is a subset of JavaScript.

16. The method of claim 1 comprising converting the item of software from the first type of intermediate representation to the script representation.

17. The method of claim 1 wherein the item of software is an application for execution on a user device.

18. The method of claim 1 wherein the item of software is one or more of a library, a module and an agent.

19. The method of claim 1 wherein the item of software is an item of security software.

20. The method of claim 1 further comprising delivering the item of software to a user device for execution.

21. The method of claim 1 further comprising also carrying out protection of the item of software in the first type of intermediate representation and/or carrying out optimization of the item of software in the second type of intermediate representation and/or carrying out protection of the item of software in another type of intermediate representation different from the first and second types of intermediate representations and/or carrying out optimization of the item of software in another type of intermediate representation different from the first and second types of intermediate representations.

22. A method comprising:
carrying out protection, in a first type of intermediate representation, of an item of software represented in the first type of intermediate representation by applying one or more protection techniques to the item of software, wherein the one or more protection techniques comprise one or more of white box protection techniques, node locking techniques, data flow obfuscation, control flow obfuscation and transformation, homomorphic data transformation, key hiding, program interlocking and boundary blending;
converting the item of software from being represented in the first type of intermediate representation to being represented in a second type of intermediate representation;
carrying out further protection, in the second type of intermediate representation, of the item of software represented in the second type of intermediate representation by applying one or more further protection techniques to the item of software, wherein the second type of intermediate representation is different from the first type of intermediate representation and the one or more further protection techniques comprise one or more of white box protection techniques, node locking techniques, data flow obfuscation, control flow obfuscation and transformation, homomorphic data transformation, key hiding, program interlocking and boundary blending; and
outputting the item of software, after carrying out the protection and the further protection, in either (i) a source code representation or (ii) a script representation suitable for use by a web browser.

23. The method of claim 22 further comprising carrying out optimization of the item of software in at least one of: the first type of intermediate representation; the second type of intermediate representation; and another type of intermediate representation different from the first and second intermediate types of representations.

24. One or more non-transitory computer readable media comprising computer program code that, when executed by one or more processors, causes the one or more processors to:
carry out protection, in a first type of intermediate representation, of an item of software represented in the first type of intermediate representation by applying one or more protection techniques to the item of software, wherein the one or more protection techniques comprise one or more of white box protection techniques, node locking techniques, data flow obfuscation, control flow obfuscation and transformation, homomorphic data transformation, key hiding, program interlocking and boundary blending;
carry out optimization and/or further protection, in a second type of intermediate representation, of the item of software represented in the second type of intermediate representation, wherein the second type of intermediate representation is different from the first type of intermediate representation, wherein said optimization comprises optimization for one or more of size, runtime speed, runtime memory requirement, and usage of core and GPU processors, of the item of software, and wherein said further protection comprises applying one or more further protection techniques to the item of software, wherein the one or more further protection techniques comprise one or more of white box protection techniques, node locking techniques, data flow obfuscation, control flow obfuscation and transformation, homomorphic data transformation, key hiding, program interlocking and boundary blending; and
outputting the item of software, after carrying out the protection and the optimization and/or further protection, in either (i) a source code representation or (ii) a script representation suitable for use by a web browser;
wherein the computer program code, when executed by the one or more processors, causes the one or more processors to carry out one or both of: (a) converting the item of software from being represented in the first type of intermediate representation to being represented in the second type of intermediate representation after carrying out protection and before subsequently carrying out optimization and/or further protection; and (b) converting the item of software from being represented in the second type of intermediate representation to being represented in the first type of intermediate representation after carrying out optimization and/or further protection and before subsequently carrying out protection.

25. Computer apparatus for protecting an item of software, comprising:
an optimizer component arranged to carry out, in a first type of intermediate representation, optimization of the item of software represented in the first type of intermediate representation, wherein the optimization comprises optimization for one or more of size, runtime speed, runtime memory requirement, and usage of core and GPU processors, of the item of software;
a protector component arranged to carry out, in a second type of intermediate representation, protection of the item of software represented in the second type of intermediate representation by applying one or more protection techniques to the item of software, wherein the one or more protection techniques comprise one or more of white box protection techniques, node locking techniques, data flow obfuscation, control flow obfuscation and transformation, homomorphic data transformation, key hiding, program interlocking and boundary blending;
one or more converters arranged to carry out one or both of: (a) converting the item of software from being represented in the first type of intermediate representation to being represented in the second type of intermediate representation; and (b) converting the item of software from being represented in the second type of intermediate representation to being represented in the first type of intermediate representation; and
an output arranged to output the item of software, after the optimizer component has carried out the optimization and the protector component has carried out the protection, in either (i) a source code representation or (ii) a script representation suitable for use by a web browser.

26. The apparatus of claim 25, wherein the apparatus is arranged such that the optimizer component carries out optimization in the first type of intermediate representation of the item of software both before and after the protector component carries out protection in the second type of intermediate representation of the item of software.

27. The apparatus of claim 25, wherein the apparatus is arranged such that the protector component carries out protection in the second type of intermediate representation of the item of software both before and after the optimizer component carries out protection in the first type of intermediate representation of the item of software.

28. The apparatus of claim 25 wherein the first type of intermediate representation is LLVM IR.

29. The apparatus of claim 25 wherein the optimization component comprises one or more LLVM optimization tools.

30. The apparatus of claim 25 further comprising an input converter arranged to convert the item of software from an input type of representation to LLVM IR.

31. The apparatus of claim 30 wherein the input type of representation is one of a binary representation, and a source code representation.

32. The apparatus of claim 25 further comprising a binary rewriting protection tool arranged to apply binary rewriting protection to the item of software.

33. The apparatus of claim 25 wherein the protector component is also arranged to carry out protection of the item of software in the first type of intermediate representation.

34. The apparatus of claim 25 comprising a further protector component arranged to carry out protection of the item of software in the first type of intermediate representation.

* * * * *